United States Patent
Zhang et al.

(10) Patent No.: US 11,805,526 B2
(45) Date of Patent: *Oct. 31, 2023

(54) PHYSICAL UPLINK CONTROL CHANNEL (PUCCH) CONFIGURATION FOR NEW-RADIO-SPECTRUM SHARING (NR-SS)

(71) Applicant: QUALCOMM Incorporated, San Diego, CA (US)

(72) Inventors: Xiaoxia Zhang, San Diego, CA (US); Seyed Ali Akbar Fakoorian, San Diego, CA (US); Zhifei Fan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,061

(22) Filed: Jan. 26, 2023

(65) Prior Publication Data

US 2023/0199776 A1    Jun. 22, 2023

Related U.S. Application Data

(63) Continuation of application No. 16/947,797, filed on Aug. 17, 2020, now Pat. No. 11,576,160, which is a
(Continued)

(51) Int. Cl.
*H04W 16/14*  (2009.01)
*H04W 72/21*  (2023.01)
(Continued)

(52) U.S. Cl.
CPC ............ *H04W 72/21* (2023.01); *H04B 1/707* (2013.01); *H04B 1/713* (2013.01);
(Continued)

(58) Field of Classification Search
CPC ...... H04W 72/21; H04W 15/14; H04B 1/713; H04B 1/707; H04L 5/0048; H04J 13/0048
See application file for complete search history.

(56) References Cited

U.S. PATENT DOCUMENTS 10,750,484 B2 *   8/2020   Zhang ................... H04B 1/713
11,576,160 B2 *   2/2023   Zhang ................... H04B 1/713
(Continued)

FOREIGN PATENT DOCUMENTS

CN        107104780 A        8/2017

OTHER PUBLICATIONS

Huawei et al., "Resource Allocation and Transmit Diversity for PUCCH", 3GPP Draft, R1-1715405, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051338873, 10 Pages, Retrieved from the Internet:URL: http://www.3gpp.org/ftp/Meetings_3GPP_SYNC/RAN1/Docs/ [retrieved on Sep. 17, 2017].
(Continued)

*Primary Examiner* — Brenda H Pham
(74) *Attorney, Agent, or Firm* — Haynes and Boone LLP

(57) ABSTRACT

Wireless communications systems and methods related to multiplexing uplink control channel signals from different users are provided. A first wireless communication device obtains an uplink control channel multiplex configuration indicating a first frequency spreading sequence and at least one of a second frequency spreading sequence or a first spatial direction. The first wireless communication device communicates, with a second wireless communication device, a first uplink control channel signal including a first reference signal and a first uplink control information signal
(Continued)

in a frequency spectrum based on the uplink control channel multiplex configuration. The first reference signal is based on the first frequency spreading sequence and the first uplink control information signal is based on at least one of the second frequency spreading sequence or the first spatial direction.

20 Claims, 16 Drawing Sheets

Related U.S. Application Data continuation of application No. 16/191,257, filed on Nov. 14, 2018, now Pat. No. 10,750,484.

(60) Provisional application No. 62/590,093, filed on Nov. 22, 2017.

(51) Int. Cl.
| | | |
|---|---|---|
| *H04B 1/713* | (2011.01) | |
| *H04L 5/00* | (2006.01) | |
| *H04J 13/00* | (2011.01) | |
| *H04B 1/707* | (2011.01) | |

(52) U.S. Cl.
CPC ........ *H04J 13/0048* (2013.01); *H04L 5/0048* (2013.01); *H04W 16/14* (2013.01)

(56) References Cited

U.S. PATENT DOCUMENTS

| | | |
|---|---|---|
| 2017/0164352 A1 | 6/2017 | Yang et al. |
| 2020/0383106 A1 | 12/2020 | Zhang et al. |

OTHER PUBLICATIONS

Intel Corporation: "CM Evaluation for Short UL Control Channel", 3GPP Draft, R1-1700365 Intel NR PUCCH CM Analysis, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 16, 2017 (Jan. 16, 2017), XP051207902, 4 Pages.
International Preliminary Report on Patentability—PCT/US2018/061355, The International Bureau of WIPO—Geneva, Switzerland, dated Jun. 4, 2020.
International Search Report and Written Opinion—PCT/US2018/061355—ISA/EPO—dated Feb. 14, 2019.
Lenovo et al., "Long PUCCH Design for UCI of up to 2 Bits", 3GPP Draft, R1-1715541 LONGPUCCHUP2BITS_Final, 3rd Generation Partnership Project (3GPP), Mobile Competence Centre, 650, Route Des Lucioles, F-06921 Sophia Antipolis Cedex, France, vol. RAN WG1, No. Nagoya, Japan, Sep. 18, 2017-Sep. 21, 2017, Sep. 17, 2017 (Sep. 17, 2017), XP051339008, 5 Pages.
Qualcomm Incorporated: "Long PUCCH Design With More Than 2 Bits UCI Payload", 3GPP Draft, R1-1718805 Long PUCCH Design With More Than 2 Bits UCI Payload, 3rd Generation Partnership Project (3GPP), Mobile Competence Centre, 650, Route Des Lucioles, F-06921 Sophia-Antipolis CED, vol. RAN WG1, No. Prague, Czech Republic, Oct. 9, 2017-Oct. 13, 2017, Oct. 8, 2017 (Oct. 8, 2017), XP051341950, 10 Pages.
ZTE et al., "NR Short PUCCH Structure", 3GPP Draft, 3GPP TSG RAN WG1 Meeting #88bis, R1-1704373 NR Short PUCCH Structure, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017), XP051242521, 12 Pages.

* cited by examiner

PHYSICAL UPLINK CONTROL CHANNEL (PUCCH) CONFIGURATION FOR NEW-RADIO-SPECTRUM SHARING (NR-SS)

CROSS REFERENCE TO RELATED APPLICATIONS

The present application is a continuation application of U.S. Non-Provisional patent application Ser. No. 16/947,797 filed Aug. 17, 2020, which is a continuation of U.S. patent application Ser. No. 16/191,257 filed Nov. 14, 2018, which claims priority to and the benefit of the U.S. Provisional Patent Application No. 62/590,093, filed Nov. 22, 2017, the disclosure of each of which is hereby incorporated by reference in its entirety.

TECHNICAL FIELD

This application relates to wireless communication systems and methods, and more particularly to multiplexing uplink control channel signals from multiple users on the same frequency resources in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

Some spectrums may have certain power spectral density (PSD) requirements. For example, the European Telecommunications Standard Institute (ETSI) document EN 301 893 V2.1.1 specifies various PSD limits for sub-6 GHz frequency bands and the ETSI draft document EN 302 567 V2.0.22 specifies a maximum equivalent isotropic radiated power (EIRP) and an EIRP density for 60 GHz frequency bands. Some other frequency bands, such as citizens broadband radio service (CBRS) bands at about 3.5 GHz, may not restrict transmissions to a particular PSD limit. In general, different spectrums may have different PSD requirements and/or different bandwidth occupancy requirements.

One approach to meeting the PSD requirement of a frequency spectrum and allowing a wireless communication device to transmit in the frequency spectrum at a full transmit power is to spread the frequency occupancy of a transmission signal over a wider bandwidth. However, the spreading of the frequency occupancy reduces the number of wireless communication devices that can be frequency-multiplexed in the frequency spectrum.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication including obtaining, by a first wireless communication device, an uplink control channel multiplex configuration indicating a first frequency spreading sequence and at least one of a second frequency spreading sequence or a first spatial direction; and communicating, by the first wireless communication device with a second wireless communication device, a first uplink control channel signal including a first reference signal and a first uplink control information signal in a frequency spectrum based on the uplink control channel multiplex configuration, wherein the first reference signal is based on the first frequency spreading sequence and the first uplink control information signal is based on at least one of the second frequency spreading sequence or the first spatial direction.

In an additional aspect of the disclosure, a method of wireless communication including obtaining, by a first wireless communication device, an uplink control channel multiplex configuration indicating a portion of a first frequency interlace of a plurality of frequency interlaces in a frequency spectrum; and communicating, by the first wireless communication device with a second wireless communication device, a first uplink control channel signal using the portion of the first frequency interlace.

In an additional aspect of the disclosure, an apparatus including a processor configured to obtain an uplink control channel multiplex configuration indicating a first frequency spreading sequence and at least one of a second frequency spreading sequence or a first spatial direction; and a transceiver configured to communicate, with a second wireless communication device, a first uplink control channel signal including a first reference signal and a first uplink control information signal in a frequency spectrum based on the uplink control channel multiplex configuration, wherein the first reference signal is based on the first frequency spreading sequence and the first uplink control information signal is based on at least one of the second frequency spreading sequence or the first spatial direction.

In an additional aspect of the disclosure, an apparatus including a processor configured to obtain an uplink control channel multiplex configuration indicating a portion of a first frequency interlace of a plurality of frequency interlaces in a frequency spectrum; and a transceiver configured to communicate, with a second wireless communication device, a first uplink control channel signal using the portion of the first frequency interlace.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
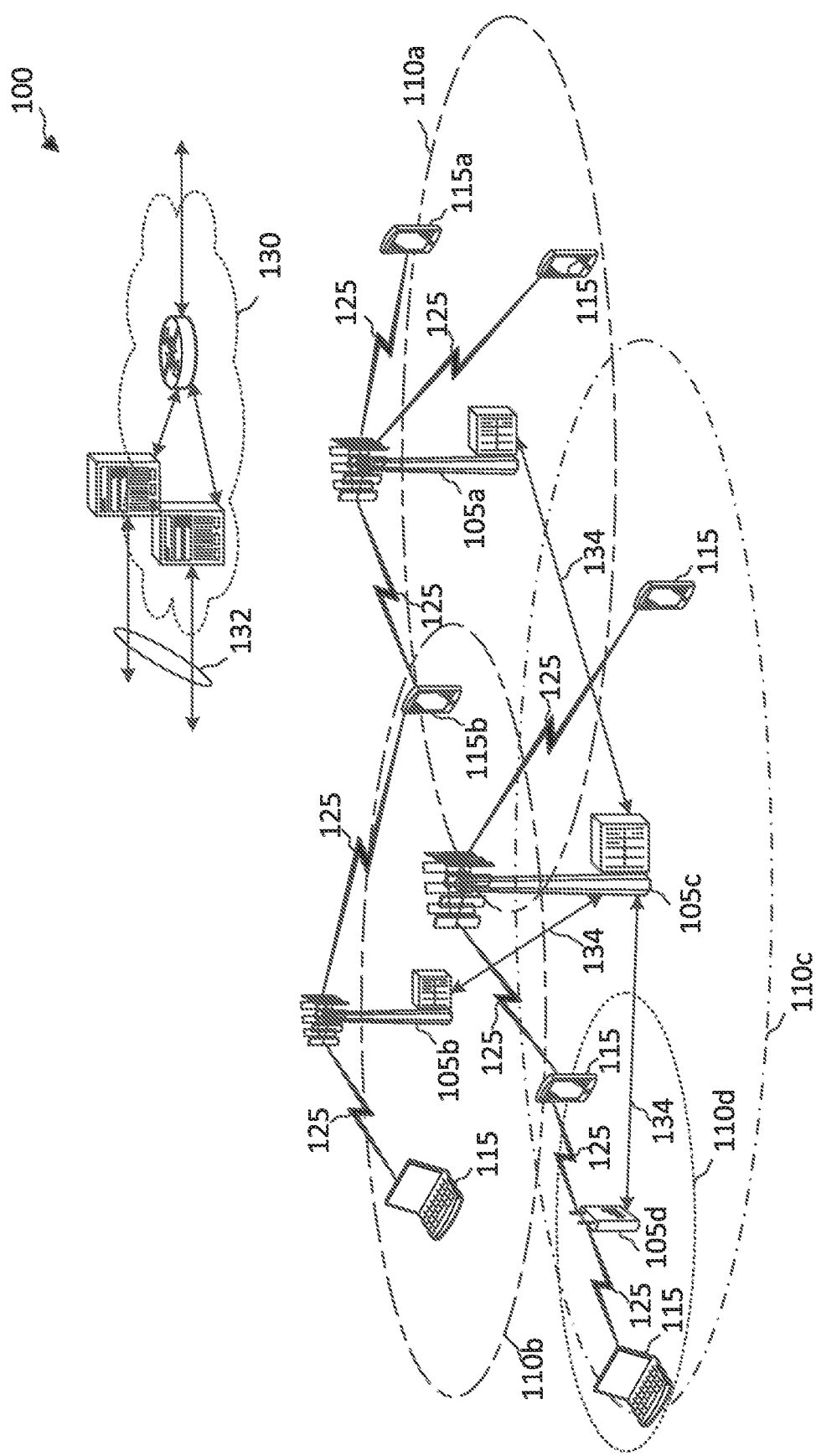
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) or new radio (NR) operating in mmWave bands) network.

In a wireless network, a base station (BS) may serve one or more UEs. Each UE may transmit uplink (UL) control information to a serving BS to facilitate scheduling at the BS. UL refers to the transmission direction from a UE to a BS. UL control channel information may include scheduling requests (SRs), channel status information, and message acknowledgements. Channel status information may include channel quality information (CQI), channel state information (CSI), pre-coding matrix indicators (PMIs), and/or rank indicators (RIs). Message acknowledgements may include hybrid automatic repeat request (HARQ) acknowledgements/not-acknowledgments (ACKs/NAKs).

In the context of LTE or NR, UL control information may be carried in a physical uplink control channel (PUCCH). NR may define various PUCCH formats for carrying UL control information of different types and/or different sizes and may support multiplexing for some PUCCH formats. For example, NR may include a PUCCH format 0, a PUCCH format 1, a PUCCH format 2, a PUCCH format 3, and a PUCCH format 4. In some instances, a PUCCH signal may carry uplink control information (UCI) and a demodulation reference signal (DMRS), which may facilitate channel estimation and UCI decoding at the BS.

In NR, a short PUCCH format 0 may span a duration of about one orthogonal frequency-division multiple (OFDM) symbol or about two OFDM symbols and may carry two or less uplink control information (UCI) bits. A long PUCCH format 1 may have a duration between about four OFDM symbols and about fourteen OFDM symbols and may carry two or less UCI bits. A short PUCCH format 2 may have a duration between about four OFDM symbols and about fourteen OFDM symbols and may carry more than two UCI bits. A long PUCCH format 3 may have a duration between about four OFDM symbols and about fourteen OFDM symbols and may carry UCI with a moderate-sized payload (e.g., including between about 2 and about N bits, where N is positive integer). A long PUCCH format 4 may have a duration between about four OFDM symbols and about fourteen OFDM symbols and may carry UCI with a large-sized payload (e.g., including greater than about N bits). NR may support multiplexing of different UEs on the same frequency resources for some of the PUCCH formats (e.g., formats 1 and 3).

As described above, some frequency spectrum such as a shared spectrum or an unlicensed spectrum may have a certain PSD requirement. To meet the PSD requirement, a UE may only be able to transmit up to a certain maximum power depending on the signal bandwidth. In order to transmit at a higher power for a better power utilization, a UE may increase the frequency occupancy of a signal transmission by spreading the signal transmission over a wider bandwidth, for example, by using frequency interlaces. However, the spreading reduces frequency-multiplexing capacity.

The present application describes mechanisms for scheduling and/or multiplexing uplink control channel signals from multiple UEs in a shared spectrum including a PSD requirement. The disclosed embodiments employ various multiplexing schemes to improve PUCCH multiplexing capacity when using frequency interlaces. The disclosed embodiments may employ time-domain code-division multiplexing (CDM), frequency-domain CDM, spatial-division multiplexing (SDM), and/or frequency multiplexing with cyclic-shift separation to multiplex PUCCH transmissions from different UEs on the same time-frequency resources (e.g., within a frequency interlace). The multiplexing schemes may be selected based on the PUCCH formats. In addition, the disclosed embodiments may assign a UE with a fraction of frequency interlace, for example, based on a PSD requirement and/or link parameters (e.g., link budgets).

In an embodiment, transmissions of PUCCH formats 0 and 2 with a duration of two symbols from different UEs can be multiplexed by using time-domain CDM, for example, by applying orthogonal cover codes (OCCs) or orthogonal time spreading sequences across single-carrier symbols.

In an embodiment, transmissions of PUCCH format 2 with a duration of one or two symbols from different UEs can be multiplexed by separately multiplexing DMRSs and UCI of different UEs. For example, DMRSs of different UEs can be multiplexed using frequency-domain CDM, for example, by applying frequency orthogonal cover codes (OCCs) or orthogonal frequency spreading sequences across frequency subcarriers or tones. UCI of different UEs can be multiplexed using frequency-domain CDM or SDM.

In an embodiment, transmissions of PUCCH formats 3 and 4 from different UEs can be multiplexed using time-domain CDM or SDM. In an embodiment, transmissions of PUCCH format 1 from different UEs can be multiplexed using cyclic-shift separation, for example, by applying cyclically-shifted sequences (e.g., a constant amplitude zero-autocorrelation (CAZAC) sequence) to pre-discrete Fourier transform (pre-DFT) modulation symbols.

Aspects of the present application can provide several benefits. For example, NR may not support multiplexing for PUCCH formats 0, 2, and 4 and may provide a moderate multiplexing capacity (e.g., up to about four UEs) for PUCCH format 3 and high multiplexing capacity (e.g., up to about 7 UEs) for PUCCH format 1. The use of time-domain CDM for PUCCH formats 0 and 2 and the use of frequency-domain CDM and SDM for PUCCH format 2 can improve spectrum utilization efficiency when using frequency interlaces. The use of time-domain CDM for PUCCH formats 3 and 4 can increase the number of multiplexing UEs to about six. The use of frequency multiplexing with cyclic-shift separation for PUCCH format 1 can further increase UE multiplexing capacity.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access.

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

During the normal operation stage, the UE 115 may transmit UL control information to a BS 105 over a PUCCH. The BS 105 may schedule the UE 115 for UL transmissions based on the received UL control information. In some instances, a BS 105 may assign multiple UEs 115 with the same PUCCH resources (e.g., time-frequency resources), using various multiplexing schemes as described in greater detail herein.

In an embodiment, the network 100 may operate over various frequency bands, for example, in frequency ranges between about 2 GHz to above 60 GHz. Different frequency bands may have different PSD requirements. For example, certain frequency bands may have a maximum allowable PSD level of about 10 decibel-milliwatts per megahertz (dBm/MHz) to about 17 dBm/MHz. Thus, a transmitter having a full power of about 23 dBm may or may not be able to utilize the full power for a signal transmission depending on the signal frequency bandwidth. To satisfy a certain PSD requirement in a frequency spectrum, a transmitter (e.g., the BSs 105 and the UEs 115) may distribute the frequency occupancy of a transmission signal over a wider bandwidth. For example, a transmitter may transmit a signal over multiple narrow frequency bands spaced apart from each other in a frequency bandwidth at a higher power than transmitting the signal over contiguous frequencies, as described in greater detail herein.

Figure 2:
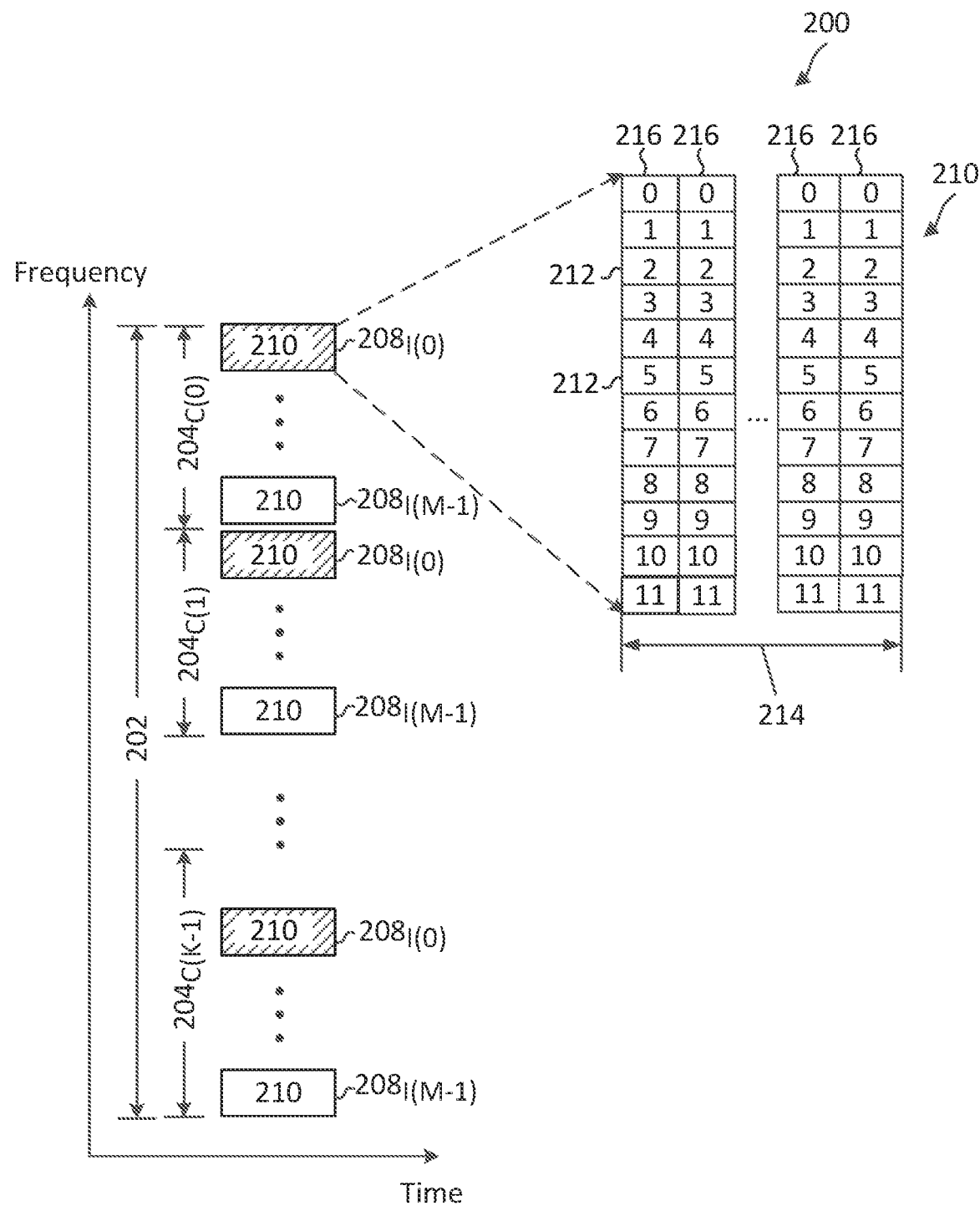
FIG. 2 illustrates a resource configuration scheme with frequency interlaces according to embodiments of the present disclosure.

FIG. 2 illustrates a resource configuration scheme 200 with frequency interlaces according to embodiments of the present disclosure. The scheme 200 may be employed by BSs such as the BSs 105 and UEs such as the UEs 115 to communicate over a frequency spectrum 202. The frequency spectrum 202 may have a bandwidth of about 10 megahertz (MHz) or about 20 MHz and a subcarrier spacing (SCS) of about 15 kilohertz (kHz), about 30 kHz, or about 20 kHz. The frequency spectrum 202 may be located at any suitable frequencies. In some embodiments, the frequency spectrum 202 may be located at about 3.5 GHz, 6 GHz, or 60 GHz. The scheme 200 allocates resources in units of frequency interlaces 208.

The frequency interlaces are shown as $208_{I(0)}$ to $208_{I(M-1)}$, where M is a positive integer. Each frequency interlace 208 may include K plurality of RBs 210 evenly spaced over the frequency spectrum 202, where K is a positive integer. In other words, the RBs 210 in a particular frequency interlace $208_{I(i)}$ are spaced apart from each other by at least one other RB 210, where i may vary between 0 and M−1. The values of K and M may vary based on several factors, such as the bandwidth, the SCS, and/or the PSD limitation of the frequency spectrum 202, as described in greater detail herein. In an embodiment, the frequency interlace $208_{I(0)}$ may be assigned to one UE and the frequency interlace $208_{I(1)}$ may be assigned to another UE. As an example, an allocation using the frequency interlace $208_{I(0)}$ are shown as patterned boxes.

A group of M localized RBs 210 forms a cluster 204. As shown, the frequency interlaces $208_{I(0)}$ to $208_{I(M-1)}$ form K clusters $204_{C(0)}$ to $204_{C(K-1)}$. Each RB 210 may span about twelve contiguous subcarriers 212 in frequency and a time period 214. The subcarriers 212 are indexed from 0 to 11. The time period 214 may span any suitable number of OFDM symbols 216. In some embodiments, the time period 214 may correspond to one transmission time interval (TTI), which may include about fourteen OFDM symbols 216.

The number of clusters 204 or the value of K may be dependent on the amount of frequency distribution required to maintain a certain PSD level. As an example, the scheme 200 may divide the frequency spectrum 202 into about ten clusters 204 (e.g., K=10) and distribute an allocation over the ten clusters 204 to increase a frequency occupancy of the allocation. In an embodiment, the frequency spectrum 202 may have a bandwidth of about 20 MHz and each subcarrier 212 may span about 15 kHz in frequency. In such an embodiment, the frequency spectrum 202 may include about ten frequency interlaces 208 (e.g., M=10). For example, an allocation may include one frequency interlace 208 having ten distributed or equally spaced RBs 210. Compared to an allocation with a single RB or ten localized RBs, the interlaced allocation with the ten distributed RBs 210 allows a UE to transmit at a higher power while maintaining the same PSD level.

In another embodiment, the frequency spectrum 202 may have a bandwidth of about 10 MHz and each subcarrier 212 may span about 15 kHz in frequency. In such an embodiment, the frequency spectrum 202 may include about five frequency interlaces 208 (e.g., M=5). Similarly, an allocation may include one frequency interlace 208 having ten distributed RBs 210. The interlaced allocation with the ten distributed RBs may allow for better power utilization than an allocation with a single RB or ten localized RBs at the same PSD level.

In another embodiment, the frequency spectrum 202 may have a bandwidth of about 20 MHz and each subcarrier 212 may span about 30 kHz in frequency. In such an embodiment, the frequency spectrum 202 may include about five frequency interlaces 208 (e.g., M=5). Similarly, an allocation may include one frequency interlace 208 having ten distributed RBs 210. The interlaced allocation with the ten distributed RBs may allow for better power utilization than an allocation with a single RB or ten localized RBs at the same PSD level.

The use of frequency interlacing to distribute an allocation into a wider bandwidth allows a transmitter to transmit at a higher power level than when an allocation occupies contiguous frequencies. As an example, the frequency spectrum 202 may have a maximum allowable PSD level of about 13 dBm/MHz and a transmitter (e.g., the UEs 115) may have a power amplifier (PA) capable of transmitting at about 23 dBm. Distributing frequency occupancy of an allocation into five clusters 204 may allow the transmitter to transmit at about 20 dBm (e.g., with a power boost of about 7 dB) while maintaining a PSD level of about 13 dBm/MHz. Distributing frequency occupancy of an allocation into ten clusters 204 may allow the transmitter to transmit at a full power of about 23 dBm (e.g., with a power boost of about 10 dB) while maintaining a PSD level of about 13 dBm/MHz. Thus, the use of frequency interlacing can provide better power utilization.

In an embodiment, the scheme 200 may be applied to a PUCCH to provide a power boost at a transmitter (e.g., the UEs 115). For example, one RB 210 may be sufficient to carry UCI of a particular PUCCH format signal. However, in order to meet the PSD requirement, a UE may extend the frequency occupancy of the PUCCH signal from one RB 210 to K RBs 210 by transmitting the PUCCH signal using one frequency interlace 208. However, the number of UEs that can be multiplexed over the frequency spectrum 202 for PUCCH signal transmissions may be reduced by a factor of about K. Mechanisms for increasing the multiplexing capacity while using frequency interlaces 208 for PUCCH transmissions are described in greater detail herein.

Figure 3:
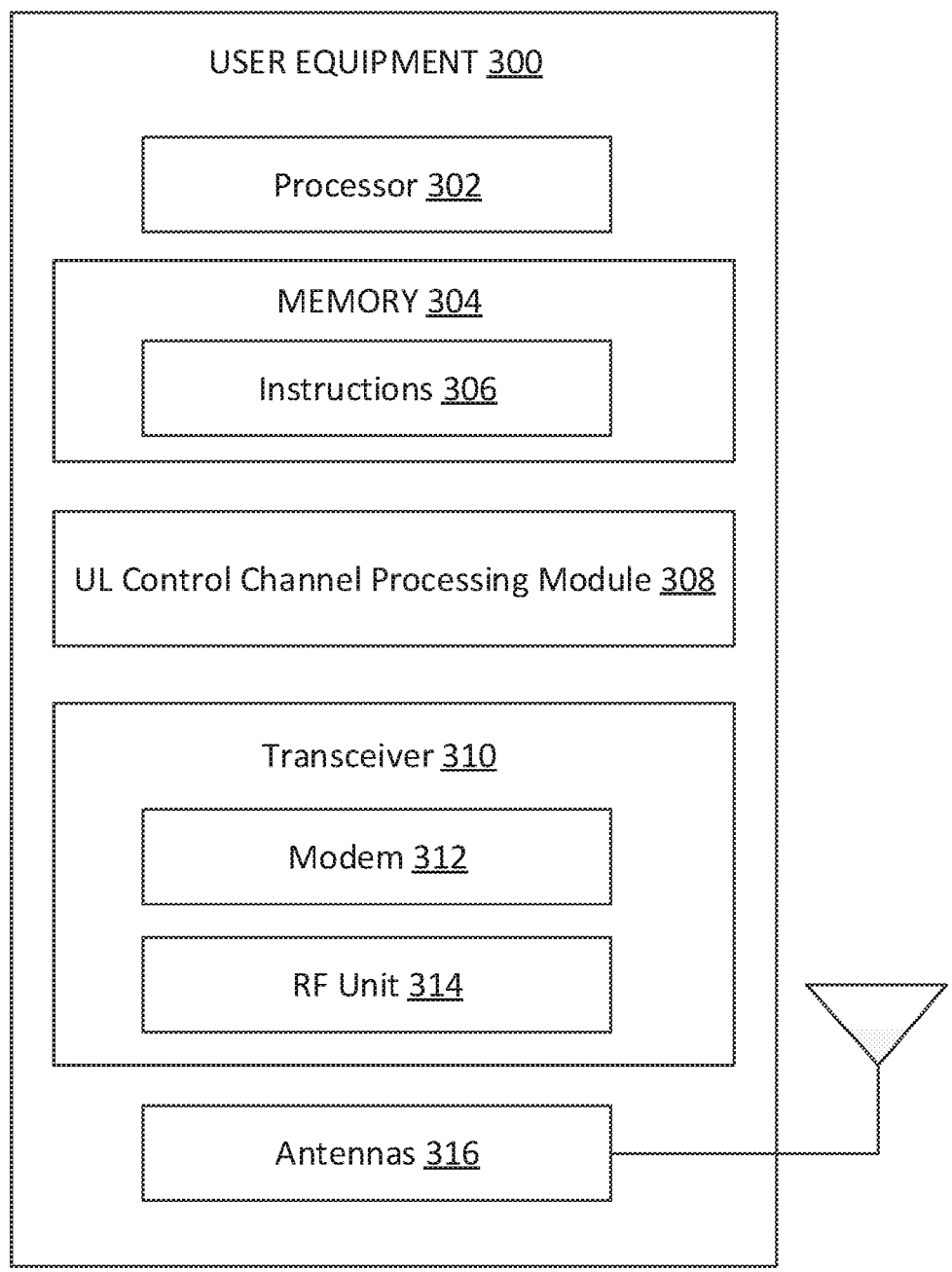
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, a UL control channel processing module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The UL control channel processing module 308 may be implemented via hardware, software, or combinations thereof. For example, the UL control channel processing module 308 may be implemented as a processor, circuit, and/or instructions 306 stored in the memory 304 and executed by the processor 302. The UL control channel processing module 308 may be used for various aspects of the present disclosure. For example, the UL control channel processing module 308 is configured to receive an uplink control channel resource and/or multiplex configurations from a BS (e.g., the BSs 105) and transmit uplink control channel signals based on the received configurations. The multiplexing configurations can include time-domain CDM, frequency-domain CDM, SDM, and/or frequency multiplexing with cyclic-shift separation and the resources can include frequency interlaces (e.g., the frequency interlaces 208) or a fraction of a frequency interlace, as described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the UL control channel processing module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of communication signals using frequency interlaces (e.g., the frequency interlaces 208) in coordination with various multiplexing schemes, according to embodiments of the present disclosure. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
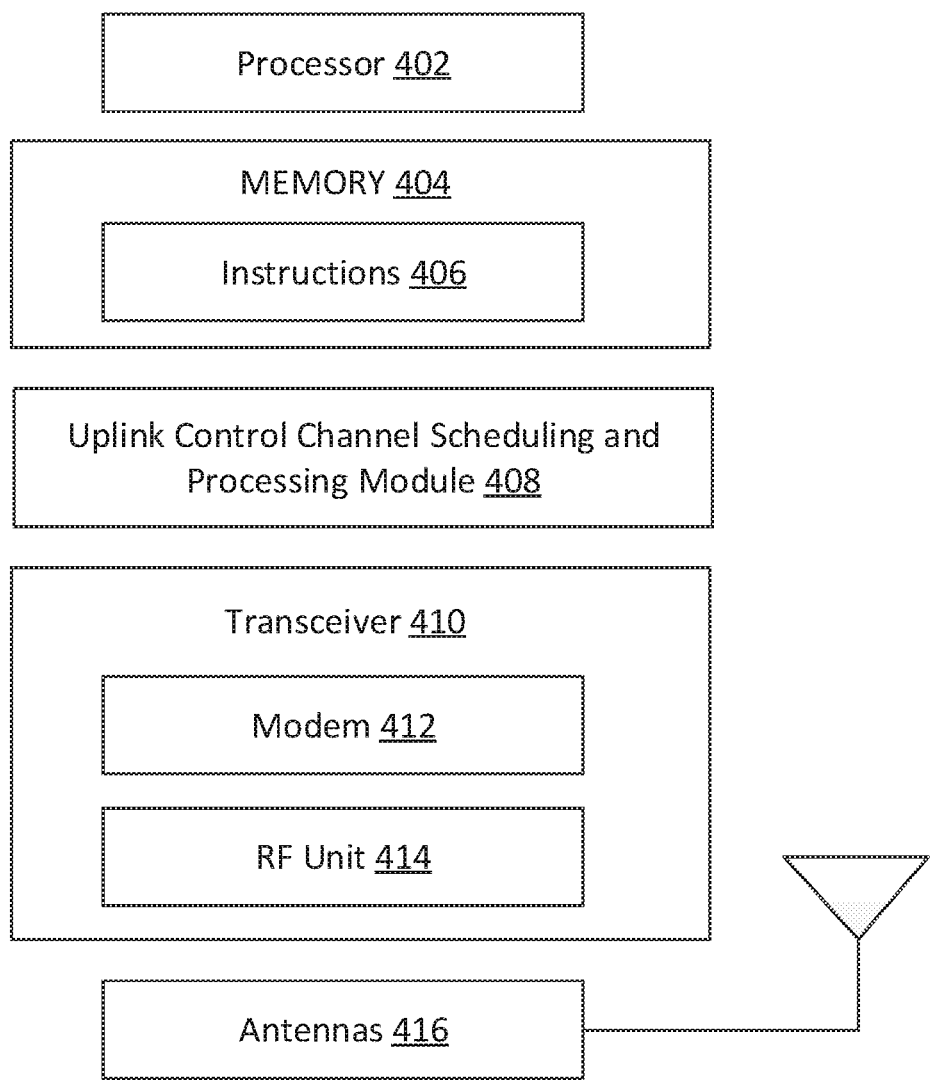
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above. A shown, the BS 400 may include a processor 402, a memory 404, a UL control channel scheduling and processing module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The UL control channel scheduling and processing module 408 may be implemented via hardware, software, or combinations thereof. For example, the UL control channel scheduling and processing module 408 may be implemented as a processor, circuit, and/or instructions 406 stored in the memory 404 and executed by the processor 402. The UL control channel scheduling and processing module 408 may be used for various aspects of the present disclosure. For example, the UL control channel scheduling and processing module 408 is configured to assign and schedule UL control channel resources and multiplexing configurations for UEs (e.g., the UEs 115 and 300) to transmit uplink control channel signals and receive uplink control channel signals from the UEs based on the assignments. The UL control channel resources can include frequency interlaces (e.g., the frequency interlaces 208) and the multiplexing configurations can include time-domain CDM, frequency-domain CDM, SDM, and/or frequency multiplexing with cyclic-shift separation, as described in greater detail herein, as described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

FIGS. 5-12 illustrate various mechanisms for multiplexing PUCCH signals from different UEs (e.g., the UEs 115 and 300) on the same resources (e.g., the frequency interlaces 208). In FIGS. 5-12, the x-axes represent time in some constant units and the y-axes represent frequency in some constant units. For simplicity of discussions, FIGS. 5 to 12 illustrate multiplexing between two UEs (e.g., a UE A and a UE B) on one RB 210. However, the embodiments of the present disclosure may scale to multiplex any suitable number of UEs (e.g., about 3, 4, 5, 6, or more than 6) on any suitable number of RBs 210s (e.g., between about 2 to about 20) within a frequency interlace 208.

Figure 5:
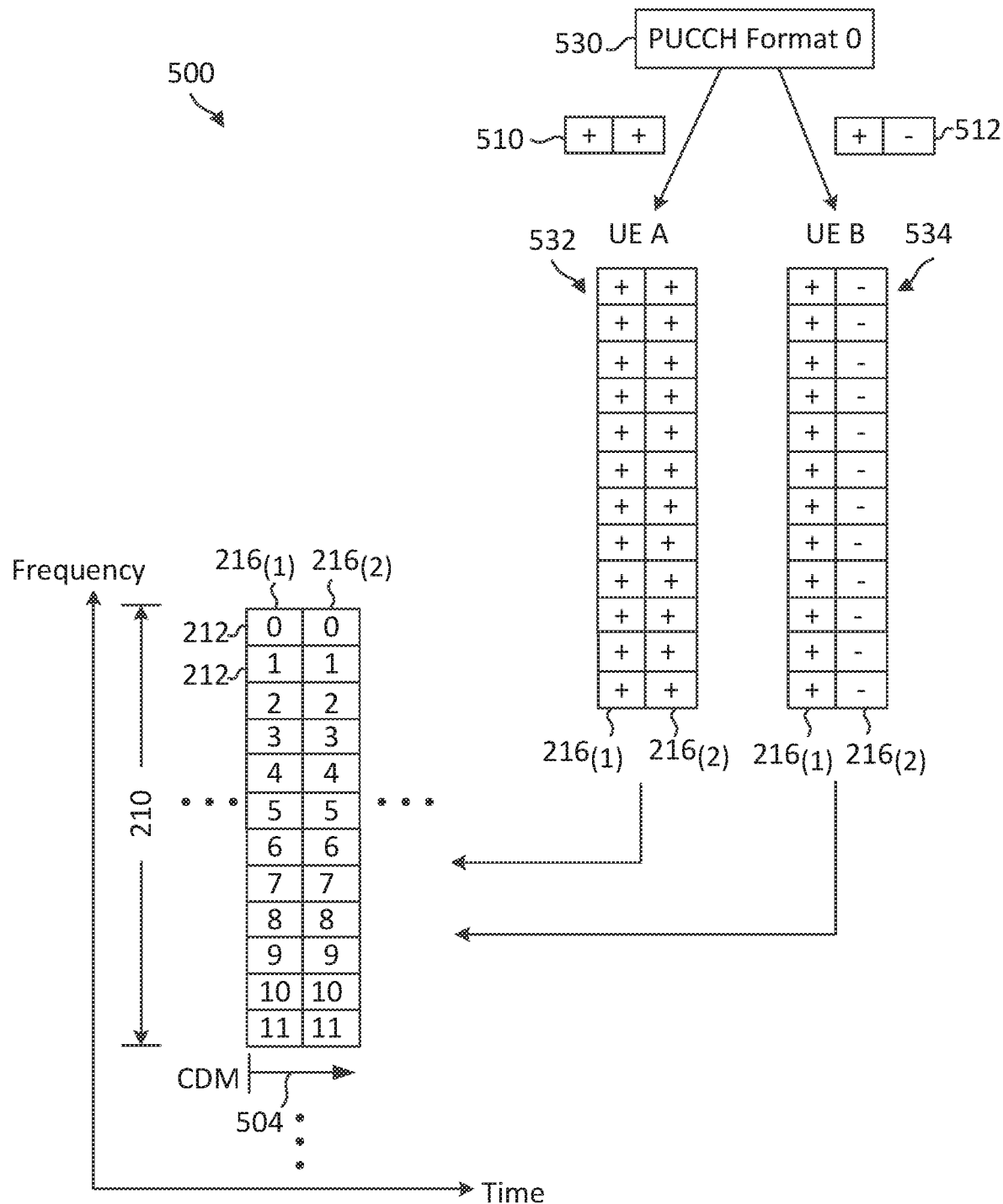
FIG. 5 illustrates an uplink control channel multiplexing scheme for short physical uplink control channel (PUCCH) signals of format 0 according to embodiments of the present disclosure.

FIG. 5 illustrates an uplink control channel multiplexing scheme 500 for short PUCCH signals 530 of format 0 according to embodiments of the present disclosure. The scheme 500 may be employed by UEs such as the UEs 115 and 300 and BSs such as the BSs 105 and 400. A short PUCCH signal 530 may carry UCI (e.g., CQI, SR, and HARQ ACK/NAK). In some instances, the UCI may be represented by different sequences. For example, a UE may transmit one sequence to indicate an ACK and another sequence to indicate an NAK. The scheme 500 multiplexes short PUCCH signals 530 with a duration of two symbols 216 from different UEs (e.g., the UE A and the UE B) on the same resource (e.g., the frequency interlace 208) by applying time-domain CDM across symbols 216 as shown by the arrow 504.

For example, a BS may schedule the UE A and the UE B to transmit on the same RB 210. The BS may assign the UE A with a time spreading sequence 510 and may assign the UE B with a time spreading sequence 512 orthogonal to the time spreading sequence 510. The time spreading sequences 510 and 512 may be defined based on Walsh codes. In an embodiment, the time spreading sequence 510 may include a first code, denoted as $\{+\}$, and a second code, denoted as $\{+\}$, and the time spreading sequence 512 may include a first code, denoted as $\{+\}$, and a second code, denoted as $\{-\}$. The orthogonal time spreading sequences 510 and 512 enable a BS to distinguish PUCCH format 0 transmissions of the UE A from PUCCH format 0 transmissions of the UE B.

When the UE A transmits a short PUCCH signal 530 on the RB 210, the UE A applies the time spreading sequence 510 to the PUCCH signal 530 as shown by the signal 532 and transmits the signal 532 on the RB 210. For example, the UE A may multiply the first symbol $216_{(1)}$ with the first code $\{+\}$ of the time spreading sequence 510 and multiply the second symbol $216_{(2)}$ with the second code $\{+\}$ of the time spreading sequence 510.

When the UE B transmits a short PUCCH signal 530 on the RB 210, the UE B may apply the time spreading sequence 512 to the PUCCH signal 530 as shown by the signal 534 and transmits the signal 534 on the RB 210. For example, the UE B may multiply the first symbol 216 with the first code $\{+\}$ of the time spreading sequence 512 and multiply the second symbol 216 with the second code $\{-\}$ of the time spreading sequence 512.

Figure 6:
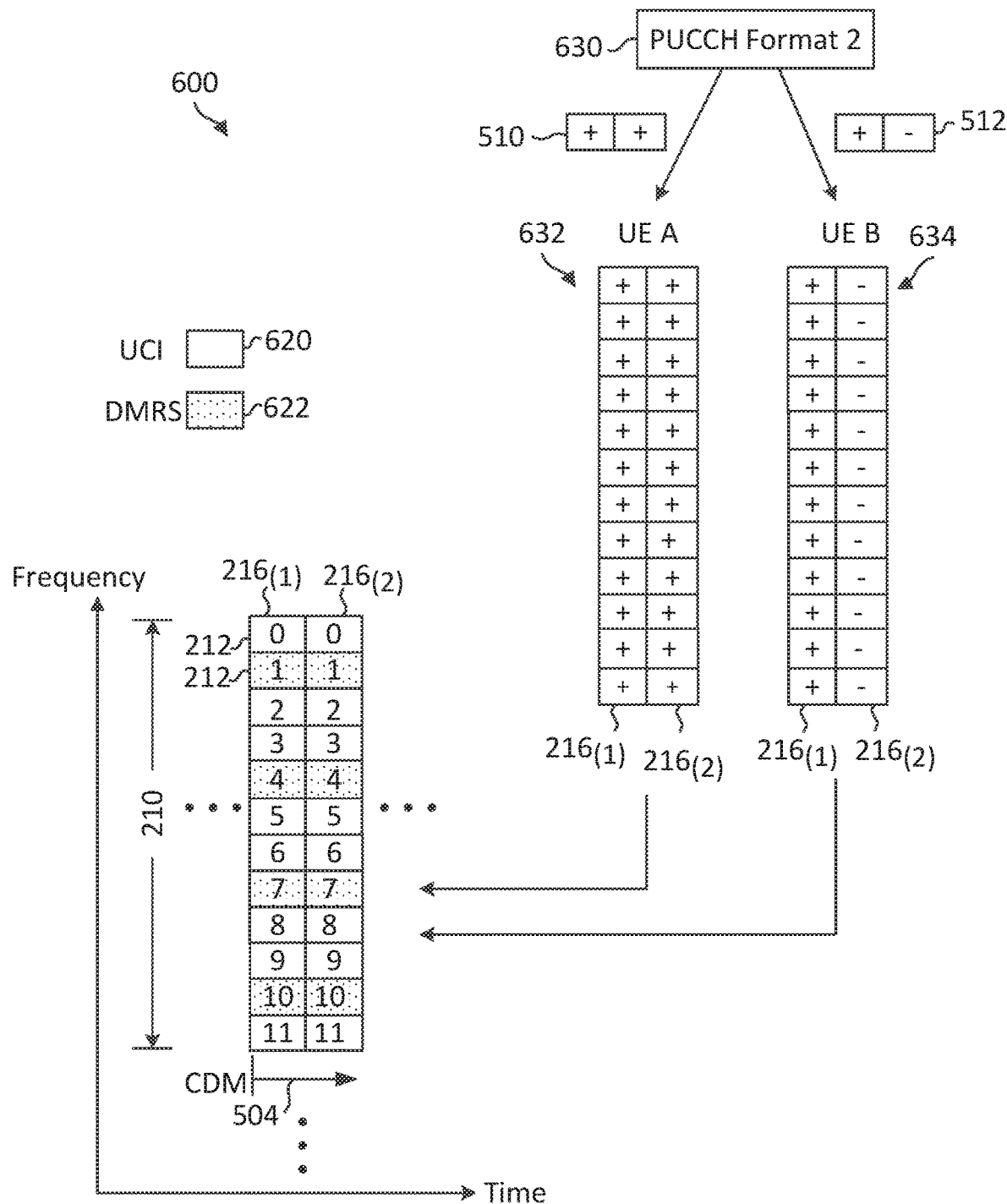
FIG. 6 illustrates an uplink control channel multiplexing scheme for short PUCCH signals of format 2 according to embodiments of the present disclosure.

FIG. 6 illustrates an uplink control channel multiplexing scheme 600 for short PUCCH signals 630 of format 2 according to embodiments of the present disclosure. The scheme 600 may be employed by UEs such as the UEs 115 and 300 and BSs such as the BSs 105 and 400. The scheme 600 is substantially similar to the scheme 500, but illustrates the multiplexing of PUCCH format 2 instead of PUCCH format 1.

A short PUCCH signal 630 may include UCI 620 and a DMRS 622. As shown, the UCI 620 may be mapped to subcarriers 212 indexed 0, 2, 3, 5, 6, 8, 9, and 11, and the DMRS 622 may be mapped to subcarriers 212 indexed 1, 4, 7, and 10. In some embodiments, the DMRS 622 and the UCI 620 may be alternatively mapped to the subcarriers 212 to achieve similar functionalities. The UCI 620 may carry information such as CQI, SR, and HARQ ACK/NAK. The DMRS 622 may be include a predetermined sequence and may be referred to as a pilot signal. The DMRS 622 allows a receiver (e.g., the BSs 105) to determine a channel estimate for decoding the UCI 620.

Similar to the scheme 500, a BS may assign a time spreading sequence 510 to the UE A and a time spreading sequence 512 to the UE B. When the UE A transmits a short PUCCH signal 630 on the RB 210, the UE A applies the time spreading sequence 510 to the PUCCH signal 630 as shown by the signal 632 and transmits the signal 632 on the RB 210. When the UE B transmits a short PUCCH signal 630 on the RB 210, the UE B may apply the time spreading sequence 512 to the PUCCH signal 630 as shown by the signal 634 and transmits the signal 634 on the RB 210.

While the scheme 500 illustrates multiplexing of short PUCCH signals 530 from different UEs and the scheme 600 illustrates multiplexing of short PUCCH signals 630 form different UEs, in some embodiments, the same time-domain CDM mechanisms can be applied to multiplex a short PUCCH signal 530 from one UE with a short PUCCH signal 630 from another UE on the same resource. In addition, when applying the schemes 500 and/or 600, the disjointed RBs 210 in a frequency interlace 208 may provide a sufficient amount of frequency diversity for the PUCCH transmissions, and thus may not require frequency-hopping on PUCCH transmissions as applied in LTE and NR. Frequency-hopping may refer to the use of different RBs (e.g., the RBs 210) in different symbols (e.g., the symbols 216) for a signal transmission.

Figure 7:
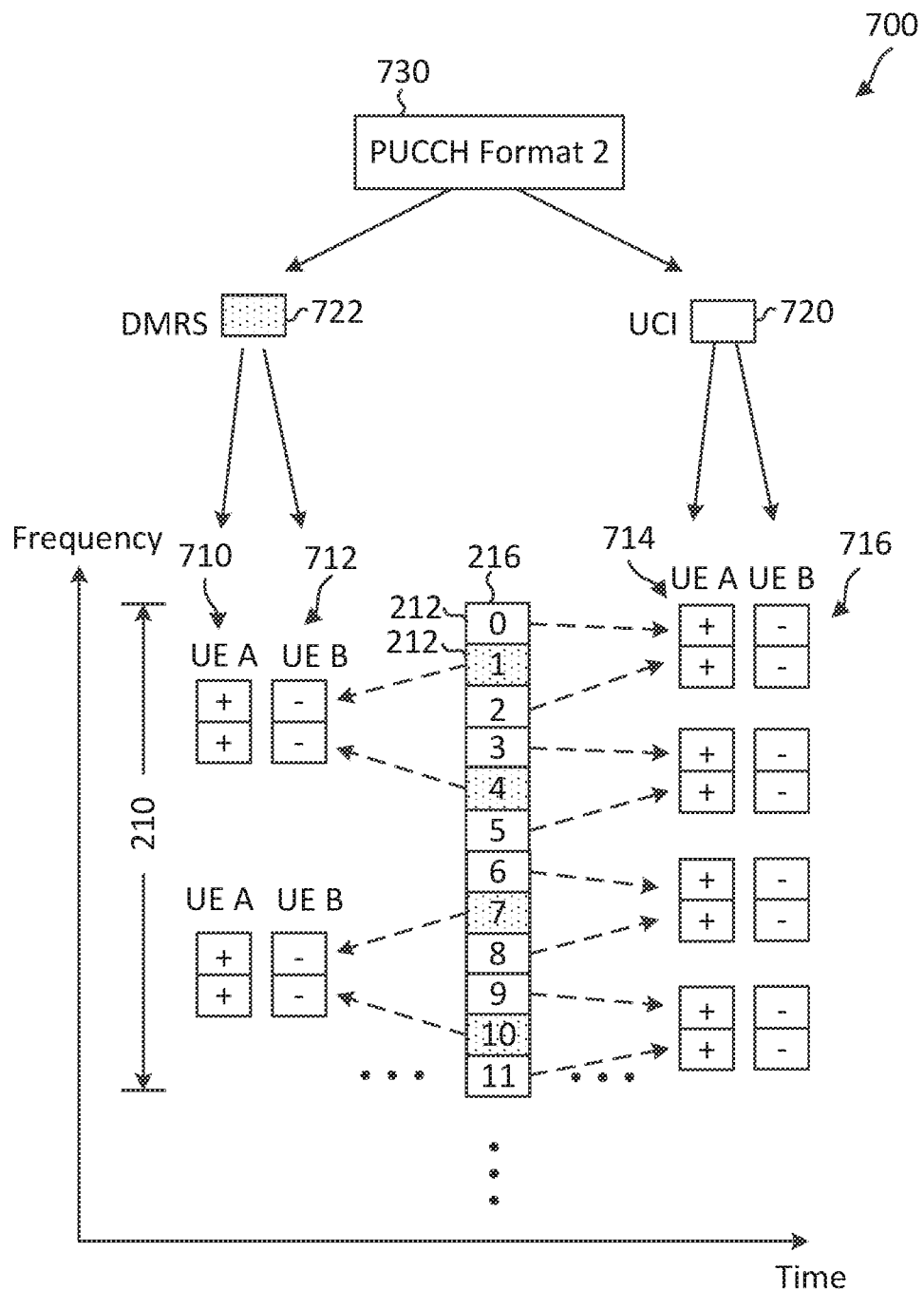
FIG. 7 illustrates an uplink control channel multiplexing scheme for short PUCCH signals of format 2 according to embodiments of the present disclosure.

FIG. 7 illustrates an uplink control channel multiplexing scheme 700 for short PUCCH signals 730 of format 2 according to embodiments of the present disclosure. The scheme 700 may be employed by UEs such as the UEs 115 and 300 and BSs such as the BSs 105 and 400. The short PUCCH signal 730 is similar to the short PUCCH signal 630, but includes one symbol 216 instead of two symbols 216. For example, the short PUCCH signal 730 may include UCI 720 (e.g., the UCI 620) and a DMRS 722 (e.g., the DMRS 622). The scheme 700 multiplexes short PUCCH signals 730 from different UEs (e.g., the UE A and the UE B) on the same resource (e.g., the frequency interlace 208) by applying frequency-domain CDM across two subcarriers 212 separately for the UCI 720 and for the DMRSs 722.

For example, a BS may schedule a UE A and a UE B to transmit on the same RB 210. The BS may assign the UE A with a frequency spreading sequence 710 for applying to a DMRS 722 and a frequency spreading sequence 714 for applying to UCI 720. The BS may assign the UE B with a frequency spreading sequence 712 orthogonal to the frequency spreading sequence 710 for applying to a DMRS 722 and a frequency spreading sequence 716 orthogonal to the frequency spreading sequence 714 for applying to UCI 720.

The frequency spreading sequences 710, 712, 714 and 716 may be defined based on Walsh codes. In an embodiment, the frequency spreading sequence 710 may include a first code, denoted as {+}, and a second code, denoted as {+}. The frequency spreading sequence 712 may include a first code, denoted as {+}, and a second code, denoted as {−}. The frequency spreading sequence 714 may include a first code, denoted as {+}, and a second code, denoted as {+}. The frequency spreading sequence 716 may include a first code, denoted as {+}, and a second code, denoted as {−}. The frequency spreading sequences 710 and 714 may be the same as shown or different from each other. Similarly, the frequency spreading sequences 712 and 716 may be the same as shown or different from each other. The orthogonal frequency spreading sequences 710 and 712 enable a BS to distinguish DMRS transmissions of the UE A from DMRS transmissions of the UE B. Similarly, the orthogonal frequency spreading sequences 714 and 716 enable a BS to distinguish UCI transmissions of the UE A from UCI transmissions of the UE B.

When the UE A transmits a short PUCCH signal 730 on the RB 210, the UE A applies the frequency spreading sequences 710 and 714 to the DMRS 722 and the UCI 720, respectively. As shown, the frequency spreading sequence 710 is separately applied to a pair of subcarriers 212 indexed 1 and 4 and a pair of subcarriers 212 indexed 7 and 10. The frequency spreading sequence 714 is separately applied to a pair of subcarriers 212 indexed 0 and 2, a pair of subcarriers 212 indexed 3 and 5, a pair of subcarriers 212 indexed 6 and 8, and a pair of subcarriers 212 indexed 9 and 11.

When the UE B transmits a short PUCCH signal 730 on the RB 210, the UE B applies the frequency spreading sequences 712 and 716 to the DMRS 722 and the UCI 720, respectively. As shown, the frequency spreading sequence 712 is separately applied to a pair of subcarriers 212 indexed 1 and 4 and a pair of subcarriers 212 indexed 7 and 10. The frequency spreading sequence 716 is separately applied to a pair of subcarriers 212 indexed 0 and 2, a pair of subcarriers 212 indexed 3 and 5, a pair of subcarriers 212 indexed 6 and 8, and a pair of subcarriers 212 indexed 9 and 11.

Figure 8:
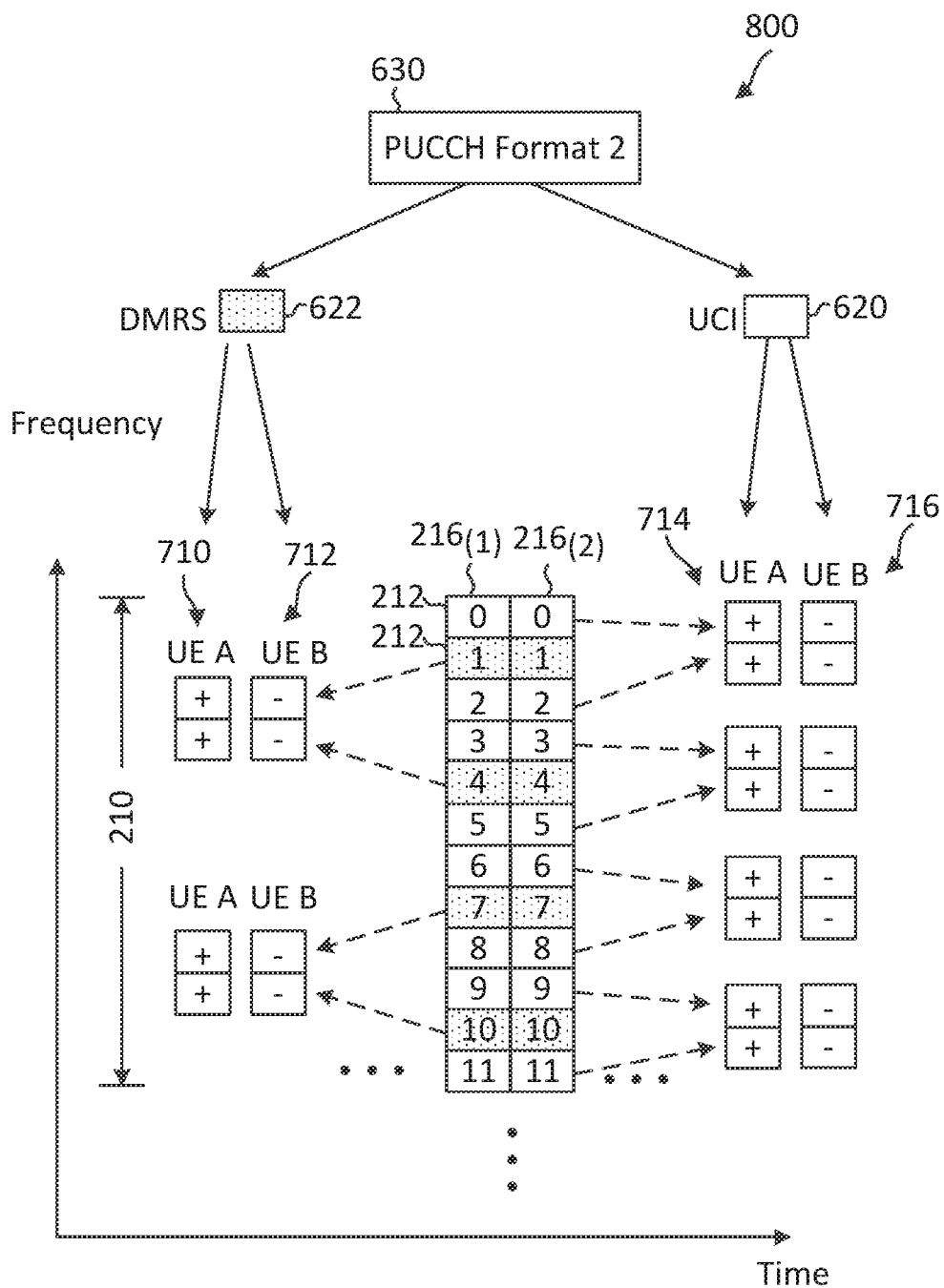
FIG. 8 illustrates an uplink control channel multiplexing scheme for short PUCCH signals of format 2 according to embodiments of the present disclosure.

FIG. 8 illustrates an uplink control channel multiplexing scheme 800 for short PUCCH signals 630 of format 2 according to embodiments of the present disclosure. The scheme 800 may be employed by UEs such as the UEs 115 and 300 and BSs such as the BSs 105 and 400. The scheme 800 is similar to the scheme 700, but illustrates the multiplexing of short PUCCH signals 630 with a duration of 2 symbols 216 instead of one symbol 216. The UE A and the UE B may simultaneously transmit a PUCCH format 2 signal 630 on the same RB 210 using the same mechanisms as described in the scheme 700.

Figure 9:
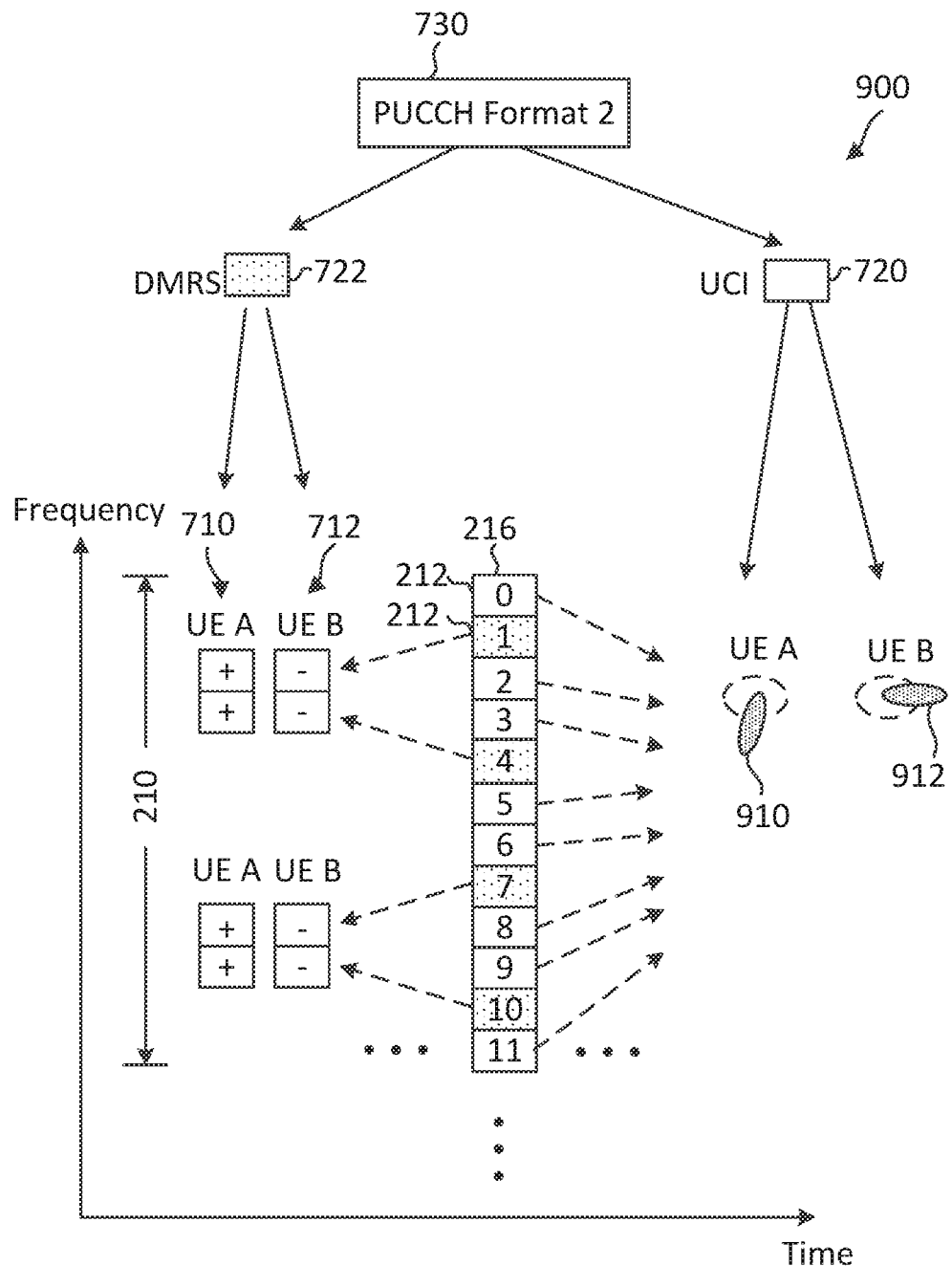
FIG. 9 illustrates an uplink control channel multiplexing scheme for short PUCCH signals of format 2 according to embodiments of the present disclosure.

FIG. 9 illustrates an uplink control channel multiplexing scheme 900 for short PUCCH format 2 signals 730 according to embodiments of the present disclosure. The scheme 900 may be employed by UEs such as the UEs 115 and 300 and BSs such as the BSs 105 and 400. Similar to the schemes 700 and 800, the scheme 900 multiplexes short PUCCH format 2 signals 730 from different UEs (e.g., the UE A and the UE B) on the same resource (e.g., the frequency interlace 208) by applying frequency-domain CDM across two subcarriers 212 for the DMRSs 722, but applies SDM for the UCI 720.

For example, a BS may schedule a UE A and a UE B to transmit on the same RB 210. The BS may assign the UE A with a frequency spreading sequence 710 for applying to a DMRS 722 and a spatial direction 910 for applying to UCI 720. The BS may assign the UE B with a frequency spreading sequence 712 for applying to a DMRS 722 and a spatial direction 912 different from the spatial direction 910 for applying to a UCI 720.

When the UE A transmits a short PUCCH signal 730 on the RB 210, the UE A applies the frequency spreading sequence 710 to the DMRS 722 and transmit the UCI 720 in the spatial direction 910. When the UE B transmits a short PUCCH format 2 signal 730 on the RB 210, the UE B applies the frequency spreading sequence 712 to the DMRS 722 and transmit the UCI 720 in the spatial direction 912.

While the scheme 900 illustrates multiplexing of short PUCCH format 2 signals 730 with a duration of one symbol 216, similar mechanisms may be applied to multiplex PUCCH format 2 signals 630 with a duration of two symbols 216.

Figure 10:
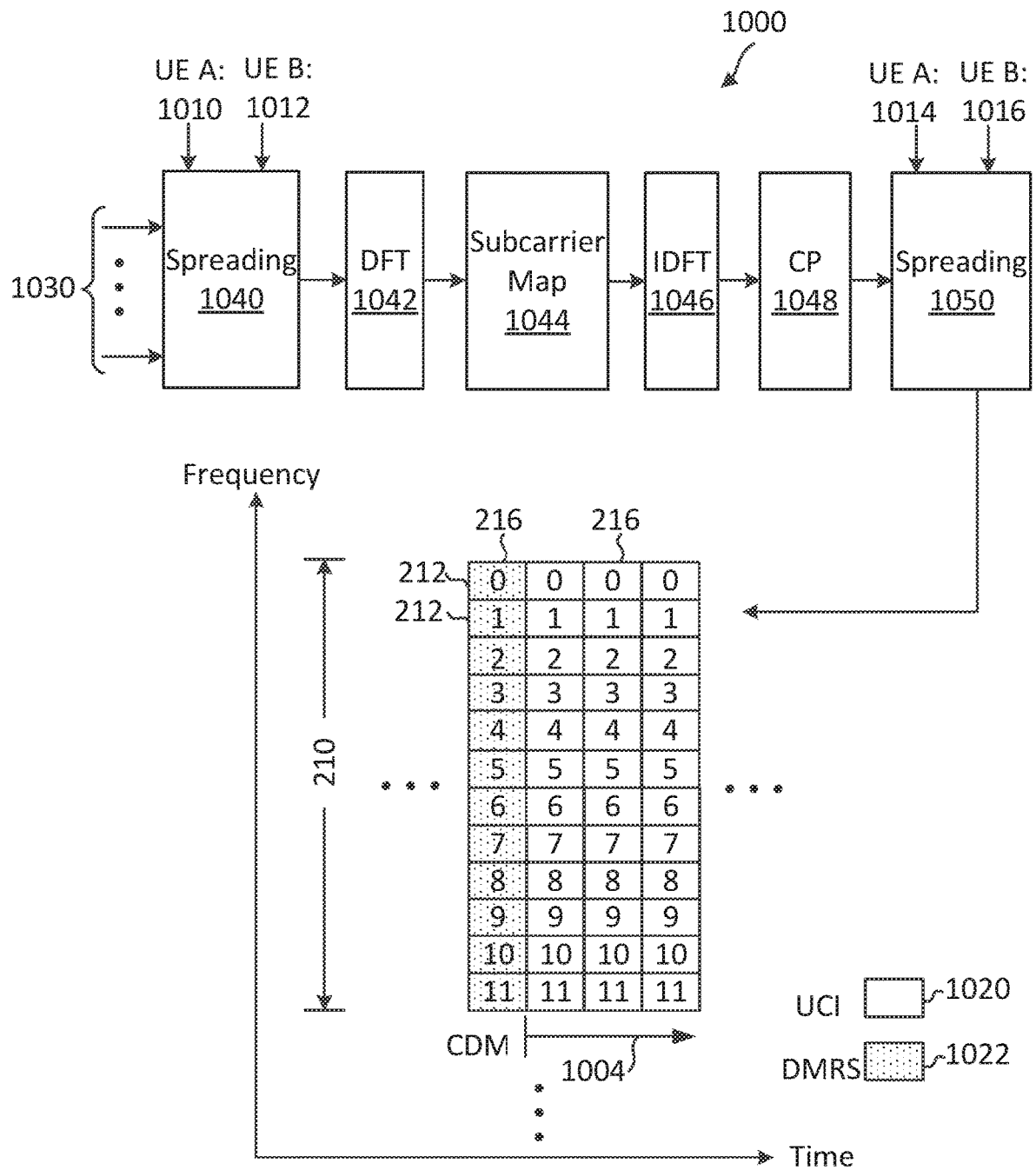
FIG. 10 illustrates an uplink control channel multiplexing scheme for long PUCCH signals of format 3 and format 4 according to embodiments of the present disclosure.

FIG. 10 illustrates an uplink control channel multiplexing scheme 1000 for long PUCCH signals 1030 of format 3 and format 4 according to embodiments of the present disclosure. The scheme 1000 may be employed by UEs such as the UEs 115 and 300 and BSs such as the BSs 105 and 400. The scheme 1000 multiplexes long PUCCH signals 1030 of format 3 and format 4 from different UEs (e.g., the UE A and the UE B) on the same resource (e.g., the frequency interlace 208) by applying pre-DFT spreading and time spreading across single-carrier symbols 216. A long PUCCH signal 1030 of format 3 or format 4 may include between about four symbols 216 to about fourteen symbols 216. The long PUCCH signal 1030 may include UCI 1020 (e.g., the UCI 620 and 720) and a DMRS 1022 (e.g., the DMRSs 622 and 722). For simplicity of discussions, FIG. 10 illustrates the multiplexing over four symbols 216, but the embodiments of the present disclosure can be scaled to multiplex over any suitable number of symbols 216 (e.g., between about four symbols 216 to about fourteen symbols 216).

For example, a BS may schedule the UE A and the UE B to transmit on the same RB 210. The BS may assign the UE A with a time spreading sequence 1010 for pre-DFT spreading and a time spreading sequence 1014 for spreading across single-carrier symbols 216. The BS may assign the UE B with a time spreading sequence 1012 orthogonal to the time spreading sequence 1010 for pre-DFT spreading and a time spreading sequence 1016 orthogonal to the time spreading sequence 1014 for spreading across single-carrier symbols 1014 as shown by arrow 1004. In an embodiment, the time spreading sequence 1014 may include codes {+, +, +} and the time spreading sequence 1016 may include codes {−, −, −} for spreading across three symbols 216.

The scheme 1000 includes a spreading component 1040, a DFT component 1042, a subcarrier mapping component 1044, an inverse-DFT (IDFT) component 1046, a cyclic prefix (CP) component 1048, and a spreading component 1050. The spreading component 1040, the DFT component 1042, the subcarrier mapping component 1044, the IDFT component 1046, the CP component 1048, and the spreading component 1050 may be implemented using software and/or hardware components at a UE (e.g., the UEs 115 and 300, the UE A, and the UE B).

The spreading component 1040 spreads an input long PUCCH signal 1030 signal (e.g., including modulation symbols of the UCI 1020 and the DMRS 1022) based on a time spreading sequence. For example, at the UE A, the spreading component 1040 may apply the time spreading sequence 1010 for the spreading. Alternatively, at the UE B, the spreading component 1040 may apply the time spreading sequence 1012 for the spreading.

The DFT component 1042 performs a DFT on an input signal to produce a frequency-domain signal. The subcarrier mapping component 1044 maps an input signal to subcarriers 212. The IDFT component 1046 performs an IDFT on an input signal to produce a time-domain signal. The CP component 1048 generates a CP from an input signal and appends the CP to the input signal to produce a single-carrier symbol (e.g., the symbols 216).

The spreading component 1050 spreads an input single-carrier symbol across time based on a time spreading sequence. For example, at the UE A, the spreading component 1050 may apply the time spreading sequence 1014. Alternatively, at the UE B, the spreading component 1050 may apply the time spreading sequence 1016. In an embodiment, the spreading component 1050 is applied to the symbols 216 carrying the UCI 1020 as shown by the arrow 1004.

Figure 11:
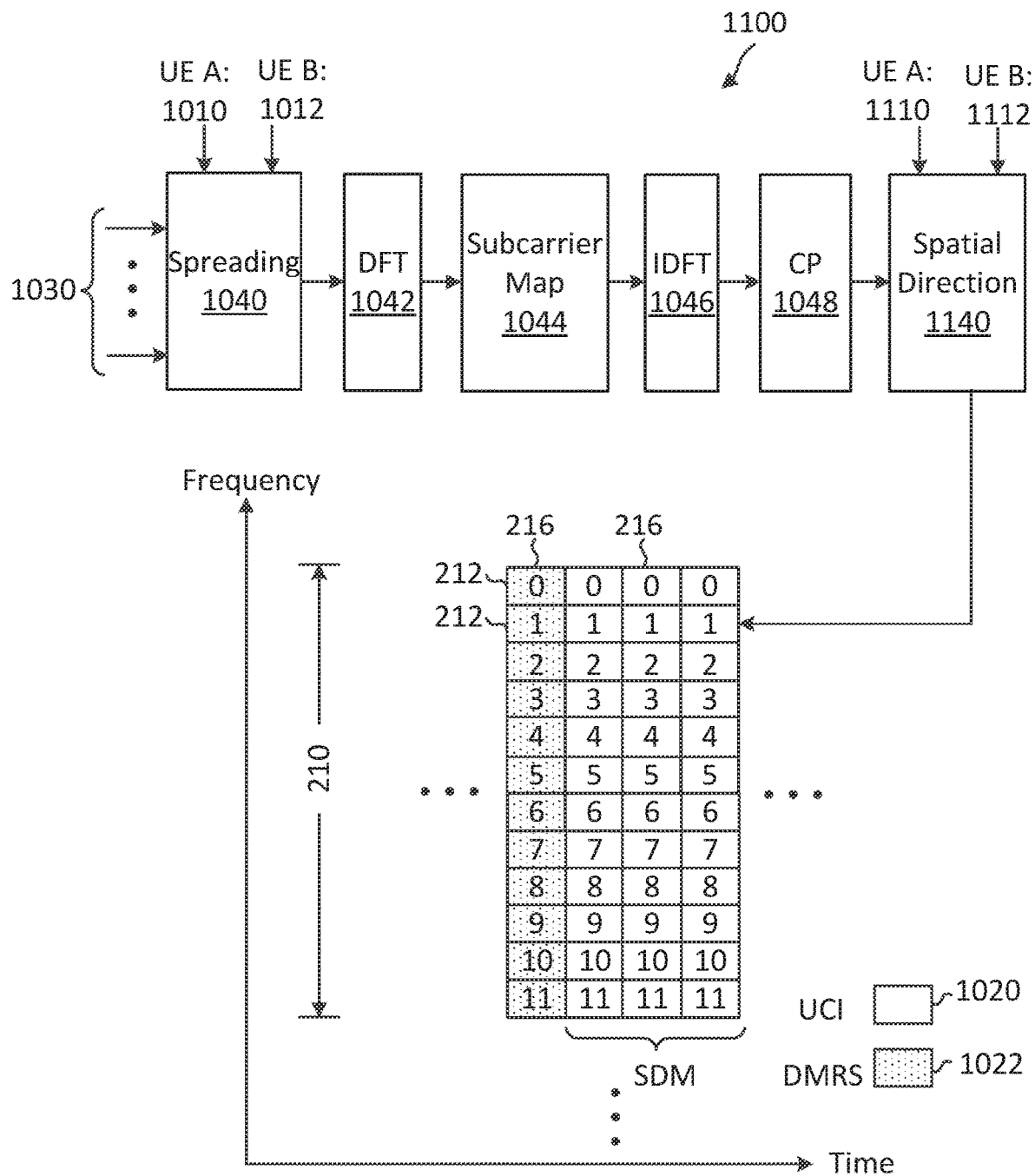
FIG. 11 illustrates an uplink control channel multiplexing scheme for long PUCCH signals of format 3 and format 4 according to embodiments of the present disclosure.

FIG. 11 illustrates an uplink control channel multiplexing scheme 1100 for long PUCCH signals 1030 of format 3 and format 4 according to embodiments of the present disclosure. The scheme 1100 may be employed by UEs such as the UEs 115 and 300 and BSs such as the BSs 105 and 400. Similar to the scheme 1000, the scheme 1100 multiplexes long PUCCH signals 1030 of format 3 and format 4 from different UEs (e.g., the UE A and the UE B) on the same resource (e.g., the frequency interlace 208) by applying pre-DFT spreading, but applies SDM to the symbols 216 carrying UCI 1020.

For example, a BS may schedule a UE A and a UE B to transmit on the same RB 210. The BS may assign the UE A with a time spreading sequence 1010 for pre-DFT spreading and a spatial direction 1110 (e.g., the spatial direction 910) for transmitting UCI 1020. The BS may assign the UE B with a time spreading sequence 1012 orthogonal to the time spreading sequence 1010 for pre-DFT spreading and a spatial direction 1112 (e.g., the spatial direction 912) different from the spatial direction 1110 for transmitting UCI 1020. In an embodiment, a BS may configure a receive beam based on the spatial direction 1110 and another receive beam based on the spatial direction 1112 to receive UCI 1020 from the UE A and receive UCI 1020 from the UE B concurrently.

The scheme 1100 includes a spreading component 1040, a DFT component 1042, a subcarrier mapping component 1044, an IDFT component 1046, a CP component 1048, and a spatial direction configuration component 1140. The spreading component 1040, the DFT component 1042, the subcarrier mapping component 1044, the IDFT component 1046, the CP component 1048, and the spatial direction configuration component 1140 may be implemented using software and/or hardware components at a UE (e.g., the UEs 115 and 300, the UE A, and the UE B). In the scheme 1100, the spreading component 1040, the DFT component 1042, the subcarrier mapping component 1044, the IDFT component 1046, and the CP component 1048 may perform similar functions as in the scheme 1000.

The spatial direction configuration component 1140 can configure a transmission beam to be directed towards a particular spatial direction, for example, based on analog beamforming and/or digital beamforming. For example, at the UE A, the spatial direction configuration component 1140 may configure a transmission beam carrying UCI 1020 to be directed towards the spatial direction 1110. Alternatively, at the UE B, the spatial direction configuration component 1140 may configure a transmission beam carrying UCI 1020 to be directed towards the spatial direction 1112.

Figure 12:
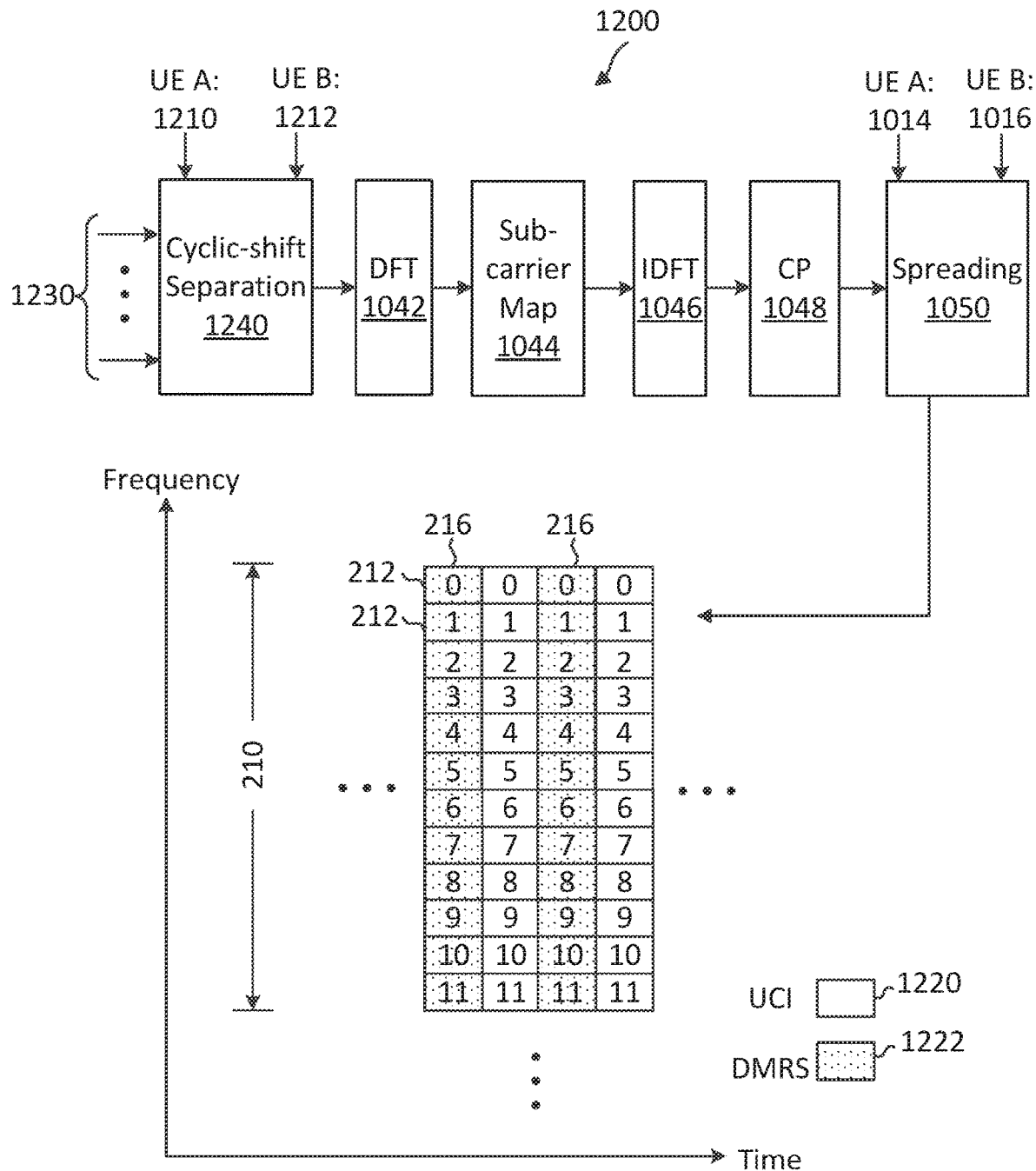
FIG. 12 illustrates an uplink control channel multiplexing scheme for long PUCCH signals of format 1 according to embodiments of the present disclosure.

FIG. 12 illustrates an uplink control channel multiplexing scheme 1200 for long PUCCH signals 1230 of format 1 according to embodiments of the present disclosure. The scheme 1200 may be employed by UEs such as the UEs 115 and 300 and BSs such as the BSs 105 and 400. The scheme 1200 multiplexes long PUCCH signals 1230 from different UEs (e.g., the UE A and the UE B) on the same resource (e.g., the frequency interlace 208) by applying pre-DFT cyclic-shift separation and time spreading across single-carrier symbols 216. A long PUCCH signal 1230 may include between about four symbols 216 to about fourteen symbols 216. The long PUCCH signal 1230 may include UCI 1220 (e.g., the UCI 620, 720, 1020) and a DMRS 1222 (e.g., the DMRSs 622, 722, 1022). For simplicity of discussions, FIG. 12 illustrates the multiplexing over four symbols 216, but the embodiments of the present disclosure can be scaled to multiplex over any suitable number of symbols 216 (e.g., between about four symbols 216 to about fourteen symbols 216).

For example, a BS may schedule the UE A and the UE B to transmit on the same RB 210. The BS may assign the UE A with a cyclic-shift value 1210 for cyclically shifting a predetermined sequence and a time spreading sequence 1014 for spreading across single-carrier symbols 216. The BS may assign the UE B with a cyclic-shift value 1212 for cyclically shifting a predetermined sequence and a time spreading sequence 1016 orthogonal to the time spreading sequence 1014 for spreading across single-carrier symbols 216. The cyclic-shift values 1210 and 1212 may be applied to a sequence (e.g., a CAZAC sequence) where cyclic-shifted versions of the sequence are orthogonal to each other.

The scheme 1200 includes a cyclic-shift separation component 1240, a DFT component 1042, a subcarrier mapping component 1044, an IDFT component 1046, a CP component 1048, and a spreading component 1050. The cyclic-shift separation component 1240, the DFT component 1042, the subcarrier mapping component 1044, the IDFT component 1046, the CP component 1048, and the spreading component 1050 may be implemented using software and/or hardware components at a UE (e.g., the UEs 115 and 300, the UE A, and the UE B). In the scheme 1200, the DFT component 1042, the subcarrier mapping component 1044, the IDFT component 1046, the CP component 1048, and the spreading component 1050 may perform similar functions as in the schemes 1000 and 1100.

The cyclic-shift separation component 1240 cyclic-shifts a sequence (e.g., a CAZAC sequence) and multiplies modulation symbols of an input long PUCCH signal 1230 by the cyclically shifted sequence. For example, at the UE A, the cyclic-shift separation component 1240 may apply the cyclic-shift value 1210 for the cyclic-shifting. Alternatively, at the UE B, the cyclic-shift separation component 1240 may apply the cyclic-shift value 1212 for the cyclic-shifting.

Figure 13:
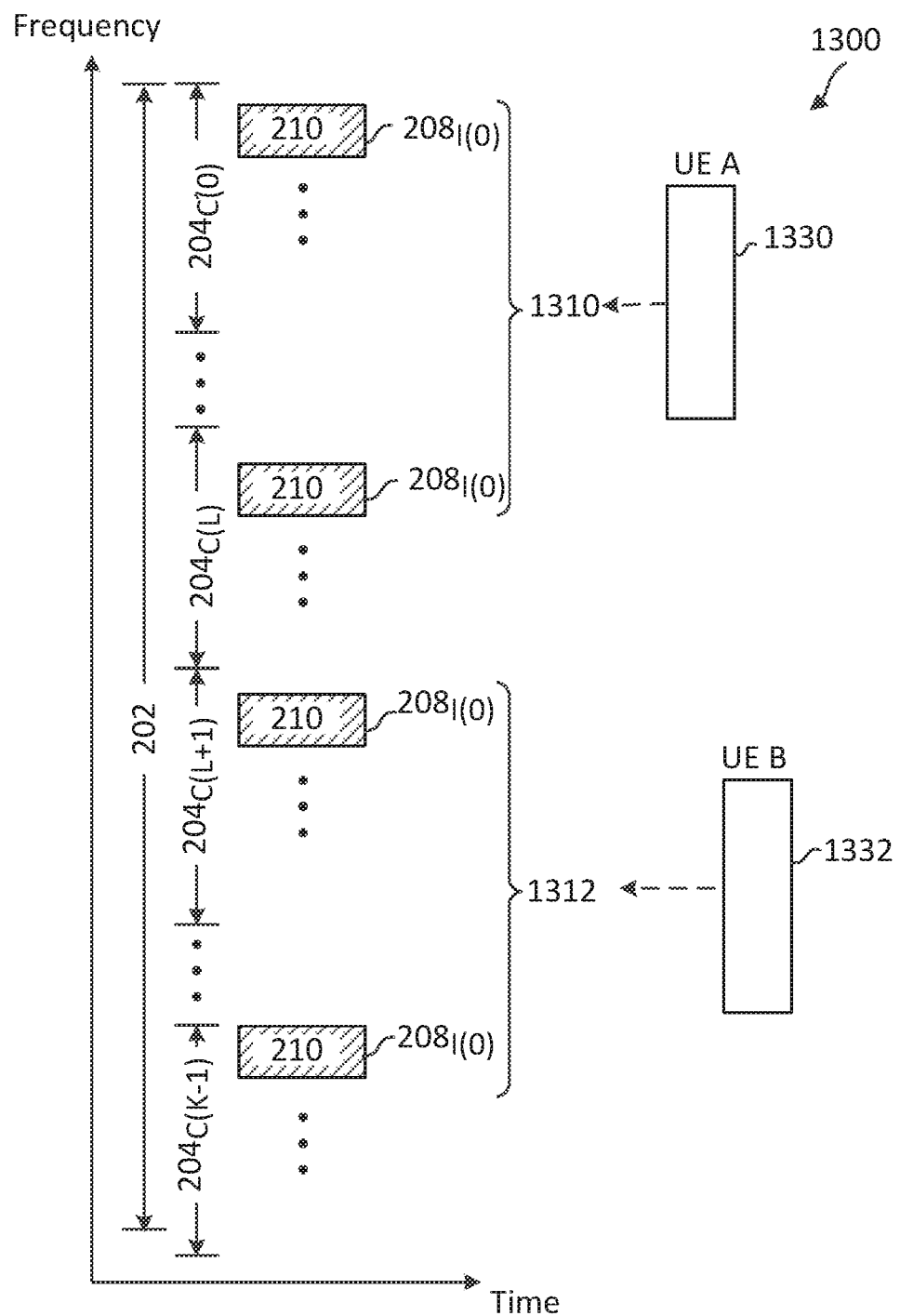
FIG. 13 illustrates an uplink control channel communication scheme using partial frequency interlaces according to embodiments of the present disclosure.

FIG. 13 illustrates an uplink control channel communication scheme 1300 using partial frequency interlaces 208 according to embodiments of the present disclosure. In FIG. 13, the x-axis represents time in some constant units and the y-axis represents frequency in some constant units. The scheme 1300 may be employed by UEs such as the UEs 115 and 300 and BSs such as the BSs 105 and 400. The scheme 1300 employs the same frequency interlace structure as in the scheme 200. The scheme 1300 may assign different portions of a frequency interlace 208 to different UEs, for example, based on a link parameter to link budget of the UEs.

For example, a BS may schedule the UE A and the UE B to transmit on the same frequency interlaces $208_{I(0)}$, but on different portions of the frequency interlace $208_{I(0)}$. As shown, a portion 1310 of the frequency interlace $208_{I(0)}$ is assigned to the UE A for transmitting a PUCCH signal 1330, which may be of PUCCH format 0, 1, 2, 3, or 4. Another portion 1312 of the frequency interlace $208_{I(0)}$ may be assigned to the UE B for transmitting a PUCCH signal 1332, which may be of PUCCH format 0, 1, 2, 3, or 4. In one embodiment, the portion 1310 and the portion 1312 may include the same number of RBs 210. In another embodiment, the portion 1310 and the portion 1312 may include different number of RBs 210.

In some embodiments, the scheme 1300 may allow different frequency-interlaced structures to be configured, for example, over different time periods. For example, the spectrum 202 may be configured to include 5 frequency interlaces 208 each including 20 RBs 210 at one time period and include 10 frequency interlaces 208 each including 10 RBs 210 at another time period. In some embodiments, the scheme 1300 may configure the spectrum 202 to include frequency interlaces 208 with different number of RBs 210 and/or with different RB spacing. The scheme 1300 may configure the frequency interlaces 208 and the assignment for a particular a link budget (e.g., based on a PSD requirement in the spectrum 202 and/or power utilization factors of the UEs).

Figure 14:
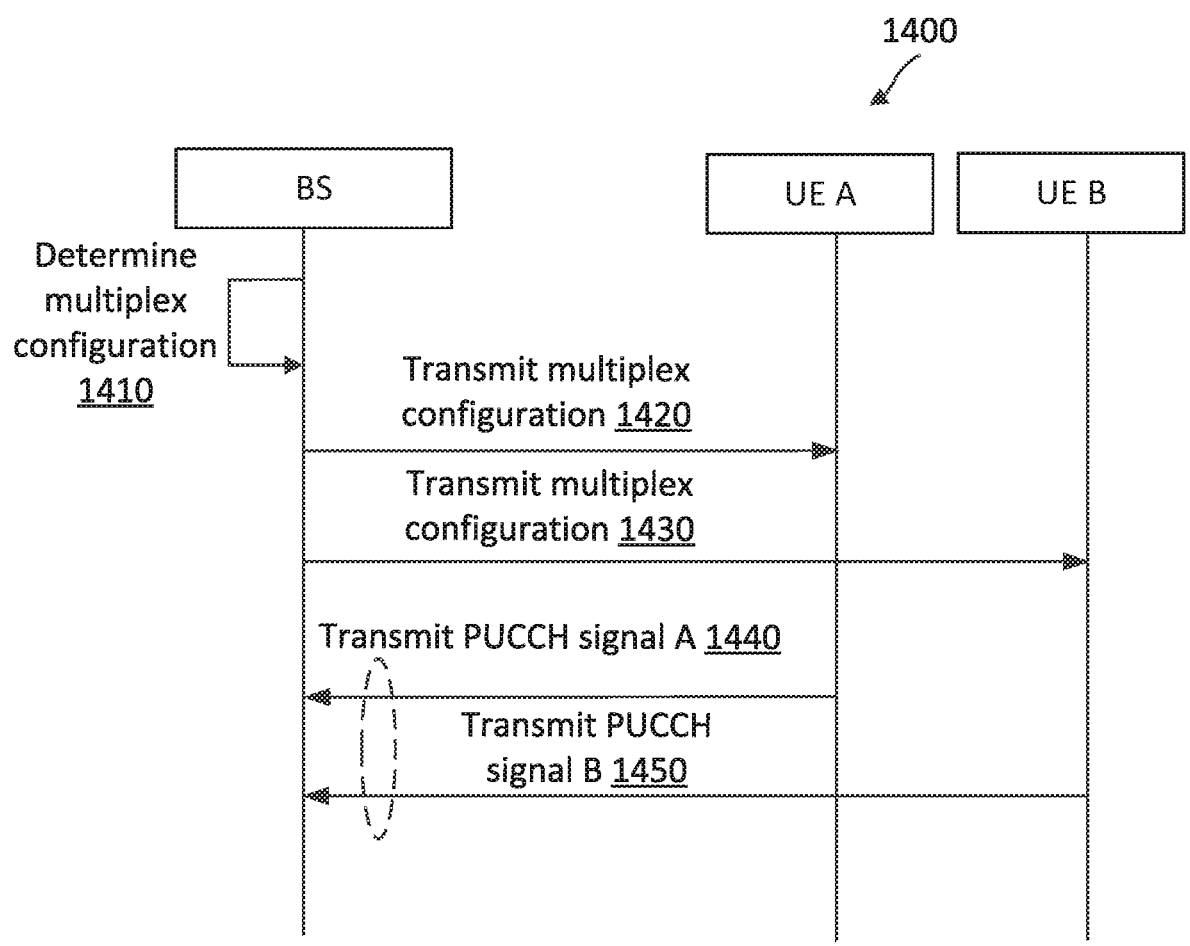
FIG. 14 is a signaling diagram of an uplink control channel communication method 1400 according to embodiments of the present disclosure

FIG. 14 is a signaling diagram of an uplink control channel communication method 1400 according to embodiments of the present disclosure. The method 1400 is implemented among a BS, a UE A, and a UE B. The BS may be similar to the BSs 105 and 400. The UEs A and B may be similar to the UEs 115 and 300. Steps of the method 1400 can be executed by computing devices (e.g., a processor, processing circuit, and/or other suitable component) of the BS and the UEs A and B. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the BS determines a multiplex configuration for multiplexing PUCCH signals from the UE A and the UE B on a frequency spectrum (e.g., the frequency spectrum 202). The PUCCH signals may be similar to the short PUCCH format 0 signals 530, the short PUCCH format 2 signals 630 and 730, the long PUCCH format 3 or 4 signals 1030, and long PUCCH format 1 signals 1230. The BS may determine the multiplex configuration based on the PUCCH format (e.g. format 0, 1, 2, 3, and/or 4) of the PUCCH signals and/or a link budget and/or power utilization factors of the UE A and the UE B. The BS may employ any suitable combination of the schemes 200, 500, 600, 700, 800, 900, 1000, 1100, 1200, and scheme 1300 described above with respect to FIGS. 2, 5, 6, 7, 8, 9, 10, 11, 12, and 13, respectively. For example, the BS may employ the scheme 1300 to select a particular frequency interlace structure or a particular fraction (e.g., the portions 1310 and 1312) of a frequency interlace (e.g., the frequency interlace 208) in conjunction with any of the schemes 500-1200. The multiplex configuration may be semi-static or dynamically determined.

At step 1420, the BS transmits the multiplex configuration to the UE A. The BS may include configuration information that is associated with the UE A in the transmission.

At step 1430, the BS transmits the multiplex configuration to the UE B. Similarly, the BS may include configuration information that is associated with the UE A in the transmission. In some embodiments, the BS may transmit the multiplex configuration to the UE A and the UE B via RRC messages.

At step 1440, the UE A transmits a PUCCH signal based on the received multiplex configuration. At step 1450, the UE B transmits a PUCCH signal based on the received multiplex configuration. The UE A and the UE B may transmit the PUCCH signals using the same frequency interlace. In one embodiment, the UE A and the UE B may transmit the PUCCH signals using the same time-frequency resources or the same RBs (e.g., the RBs 210). In another embodiment, the UE A and the UE B may transmit the PUCCH signals using different portions or different RBs of a frequency interlace.

Figure 15:
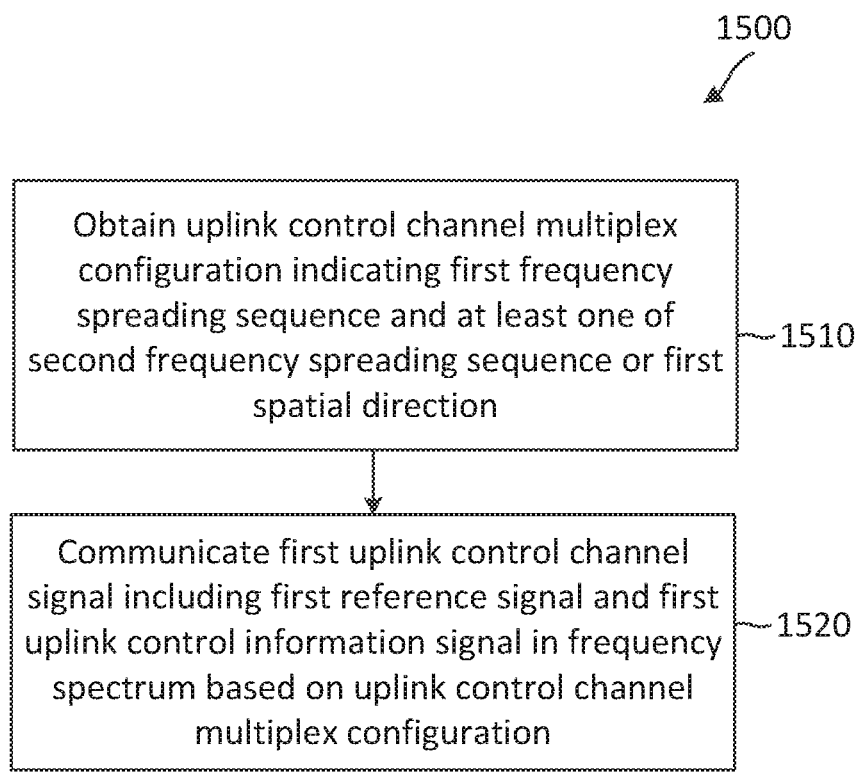
FIG. 15 is a flow diagram of an uplink control channel communication method according to embodiments of the present disclosure.

FIG. 15 is a flow diagram of an uplink control channel communication method 1500 according to embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the BSs 105 and 400 may utilize one or more components, such as the processor 402, the memory 404, the uplink channel scheduling and processing module 408, the transceiver 410, and the one or more antennas 416, to execute the steps of method 1500. Alternatively, wireless communication device, such as the UEs 115 and 300, may utilize one or more components, such as the processor 302, the memory 304, the uplink channel control channel processing module 308, the transceiver 310, the modem 312, and the one or more antennas 316, to execute the steps of method 1500. The method 1500 may employ similar mechanisms as in the schemes 200, 700, 800, 900, and 1300 and the method 1400 described with respect to FIGS. 2, 7, 8, 9, 13, and 14, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes obtaining, by a first wireless communication device, an uplink control channel multiplex configuration indicating first frequency spreading sequence (e.g., the frequency spreading sequences 710) and at least one of a second frequency spreading sequence (e.g., the frequency spreading sequences 714) or a first spatial direction (e.g., the spatial directions 910)

At step 1520, the method 1500 includes communicating, by the first wireless communication device with a second wireless communication device, a first uplink control channel signal including a first reference signal (e.g., the DMRSs 622 and 722) and a first uplink control information signal (e.g., UCI 620 and 720) in a frequency spectrum (e.g., the frequency spectrum 202) based on the uplink control channel multiplex configuration. The first reference signal is based on the first frequency spreading sequence. The second reference signal is based on at least one of the second frequency spreading sequence or the second spatial direction.

In an embodiment, the first uplink control channel signal may be a short PUCCH signal 630 with a duration of two symbols (e.g., the symbols 216). In an embodiment, the first uplink control channel signal may be a short PUCCH format 2 signal 730 with a duration of one symbol.

In an embodiment, the frequency spectrum may be shared by multiple network operating entities. The first uplink control channel signal may be communicated using a set of resource blocks (e.g., the RBs 210) spaced apart from each other by at least one other resource block in the frequency spectrum. The set of resources blocks may be within a particular frequency interlace (e.g., the frequency interlace 208). In some embodiments, the set of resource blocks may correspond to a portion (e.g., the portions 1310 and 1312) of the frequency interlace.

In an embodiment, the first wireless communication device may be a BS and the second wireless communication device may be a UE. In such an embodiment, the communicating may include receiving, by the first wireless communication device from the second wireless communication device, the first reference signal from first frequency resources based on the first frequency spreading sequence; and receiving, by the first wireless communication device from the second wireless communication device, the first uplink control information signal from second frequency resources different from first frequency resources based on at least one of the second frequency spreading sequence or the first spatial direction.

In an embodiment, when the first wireless communication device is a BS, the first wireless communication device may further receive, from a third wireless communication device (e.g., the UEs 115 and 300), a second reference signal (e.g., the DMRSs 622 and 722) of a second uplink control channel signal (e.g., the short PUCCH signals 630 and 730) from the first frequency resources based on a third frequency spreading sequence (e.g., the frequency spreading sequences 712) different from the first frequency spreading sequence. The first wireless communication device may further receive, from the third wireless communication device, a second uplink control information signal (e.g., the UCI 620 and 720) of the second uplink control channel signal from the second frequency resources based on a fourth frequency spreading sequence (e.g., the frequency spreading sequence 716) different from the second frequency spreading sequence.

In an embodiment, when the first wireless communication device is a BS, the first wireless communication device may further receive, from a third wireless communication device, a second reference signal (e.g., the DMRSs 622 and 722) of a second uplink control channel signal (e.g., the short PUCCH signals 630 and 730) from the first frequency resources based on a third frequency spreading sequence (e.g., the frequency spreading sequences 712) different from the first frequency spreading sequence. The first wireless communication device may further receive, from the third wireless communication device, a second uplink control information signal (e.g., the UCI 620 and 720) of the second uplink control channel signal from the second frequency resources based on a second spatial direction (e.g., the spatial direction 912) different from the first spatial direction.

In an embodiment, when the first wireless communication is a BS, the obtaining may include allocating resources (e.g., the frequency interlaces 208, the portions 1310 and 1312 of a frequency interlaces) for one or more wireless communication devices (e.g., the UEs 115 and 300) including the second wireless communication device, for example, based on a PSD requirement in the frequency spectrum and link and/or power parameters of the one or more wireless communication devices. The obtaining may include determining a multiplex configuration for multiplexing transmissions from the one or more wireless communication devices on a frequency interlace. The multiplex configuration may be based on time-domain CDM, frequency-domain CDM, SDM, and/or cyclic-shift separation over the same time-frequency resources (e.g., the RBs 210). The multiplex configuration may be based on partial frequency interlace assignments (e.g., the portions 1310 and 1312).

In an embodiment, the first wireless communication device may be a UE and the second wireless communication device may be a BS. In such an embodiment, the obtaining may include receiving the uplink control channel multiplex configuration from the second wireless communication device. The communicating may include spreading, by the first wireless communication device, the first reference signal in frequency based on the first frequency spreading; and spreading, by the first wireless communication device, the first uplink control information signal in frequency based on the second frequency spreading sequence. Alternatively, the communicating includes transmitting, by the first wireless communication device to the second wireless communication device, the first uplink control information signal in the first spatial direction.

Figure 16:
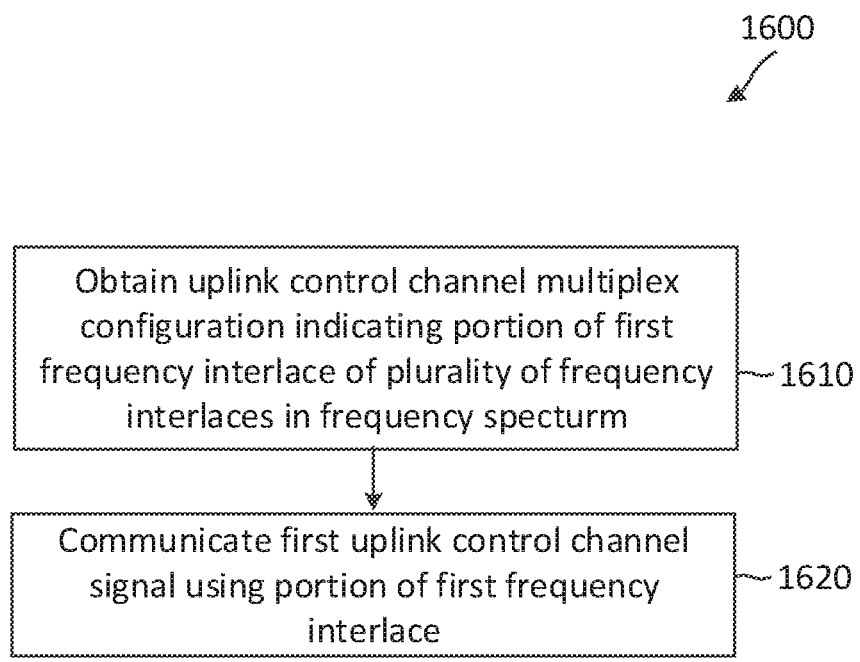
FIG. 16 is a flow diagram of an uplink control channel communication method according to embodiments of the present disclosure.

FIG. 16 is a flow diagram of an uplink control channel communication method 1600 according to embodiments of the present disclosure. Steps of the method 1600 can be executed by a computing device (e.g., a processor, processing circuit, and/or other suitable component) of a wireless communication device or other suitable means for performing the steps. For example, a wireless communication device, such as the BSs 105 and 400 may utilize one or more components, such as the processor 402, the memory 404, the uplink channel scheduling and processing module 408, the transceiver 410, and the one or more antennas 416, to execute the steps of method 1600. Alternatively, wireless communication device, such as the UEs 115 and 300, may utilize one or more components, such as the processor 302, the memory 304, the uplink channel control channel processing module 308, the transceiver 310, the modem 312, and the one or more antennas 316, to execute the steps of method 1600. The method 1600 may employ similar mechanisms as in the schemes 200, 500, 600, 700, 800, 900, 1000, 1100, 1200, and 1300 and the method 1400 described with respect to FIGS. 2, 5, 6, 7, 8, 9, 10, 11, 12, 13, and 14, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1610, the method 1600 includes obtaining, by a first wireless communication device, an uplink control channel multiplex configuration indicating a portion (e.g., the portion 1310) of a first frequency interlace (e.g., the frequency interlaces 208) of a plurality of frequency interlaces in a frequency spectrum (e.g., the frequency spectrum 202).

At step 1620, the method 1600 includes communicating, by the first wireless communication device with a second wireless communication device, a first uplink control channel signal using the portion of the first frequency interlace. The first uplink control channel signal may include a short PUCCH signal 530, a long PUCCH signal 1230, a short PUCCH signal 630, a short PUCCH format 2 signal 730, and/or a long PUCCH signal 1030 of format 3 or format 4.

In an embodiment, the frequency spectrum may be shared by multiple network operating entities. The first wireless communication device and the second wireless communication device may be associated with one of the multiple network operating entities.

In an embodiment, each of the plurality of frequency interlaces (e.g., the frequency interlaces 208) includes a set of resource blocks (e.g., the RBs 210) spaced apart from each by at least one other resource block in the frequency spectrum. The first frequency interlace may include a different spacing of resource blocks than a second frequency interlace of the plurality of frequency interlaces.

In an embodiment, the first wireless communication device is a BS and the second wireless communication device is a UE. In such an embodiment, the communicating may include receiving, by the first wireless communication device from the second wireless communication device, the first uplink control channel signal. The first wireless communication device may further receive, from a third wireless communication device (e.g., another UE), a second uplink control channel signal (e.g., the PUCCH signals 530, 630, 730, 1030, and 1230) from another portion (e.g., the portion 1312) of the first frequency interlace.

In an embodiment, when the first wireless communication is a BS, the obtaining may include allocating resources (e.g., the frequency interlaces 208, the portions 1310 and 1312 of a frequency interlaces) for one or more wireless communication devices (e.g., the UEs 115 and 300) including the second wireless communication device, for example, based on a PSD requirement in the frequency spectrum and link and/or power parameters of the one or more wireless communication devices. The obtaining may include determining a multiplex configuration for multiplexing transmissions from the one or more wireless communication devices on a frequency interlace. The multiplex configuration may be based on time-domain CDM, frequency-domain CDM, SDM, and/or cyclic-shift separation over the same time-frequency resources (e.g., the RBs 210). The multiplex configuration may be based on partial frequency interlace assignments (e.g., the portions 1310 and 1312).

In an embodiment, the first wireless communication device is a UE and the second wireless communication device is a BS. In such an embodiment, the communicating may include transmitting, by the first wireless communication device to the second wireless communication device, the first uplink control channel signal.

In an embodiment, the communicating may include communicating the first uplink control channel signal including at least one of a physical uplink control channel (PUCCH) format 0 signal, a PUCCH format 2 signal, a PUCCH format 3 signal, or a PUCCH format 4 signal based on a time spreading sequence.

In an embodiment, the communicating may include communicating the first uplink control channel signal including a physical uplink control channel (PUCCH) format 1 signal based on a cyclic-shift separation.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising obtaining, by a first wireless communication device, an uplink control channel multiplex configuration indicating a first frequency spreading sequence and at least one of a second frequency spreading sequence or a first spatial direction; and communicating, by the first wireless communication device with a second wireless communication device, a first uplink control channel signal including a first reference signal and a first uplink control information signal in a frequency spectrum based on the uplink control channel multiplex configuration, wherein the first reference signal is based on the first frequency spreading sequence and the first uplink control information signal is based on at least one of the second frequency spreading sequence or the first spatial direction.

In some embodiments, wherein the first uplink control channel signal is a short physical uplink control channel (PUCCH) format 2 signal. In some embodiments, wherein the frequency spectrum is shared by multiple network operating entities, and wherein the first uplink control channel signal is communicated using a set of resource blocks spaced apart from each other by at least one other resource block in the frequency spectrum. In some embodiments, wherein the communicating includes receiving, by the first wireless communication device from the second wireless communication device, the first reference signal from first frequency resources based on the first frequency spreading sequence; and receiving, by the first wireless communication device from the second wireless communication device, the first uplink control information signal from second frequency resources different from first frequency resources based on at least one of the second frequency spreading sequence or the first spatial direction. In some embodiments, the method further comprises receiving, by the first wireless communication device from a third wireless communication device, a second reference signal of a second uplink control channel signal from the first frequency resources based on a third frequency spreading sequence different from the first frequency spreading sequence; and receiving, by the first wireless communication device from the third wireless communication device, a second uplink control information signal of the second uplink control channel signal from the second frequency resources based on a fourth frequency spreading sequence different from the second frequency spreading sequence. In some embodiments, the method further comprise receiving, by the first wireless communication device from a third wireless communication device, a second reference signal of a second uplink control channel signal from the first frequency resources based on a third frequency spreading sequence different from the first frequency spreading sequence; and receiving, by the first wireless communication device from the third wireless communication device, a second uplink control information signal of the second uplink control channel signal from the second frequency resources based on a second spatial direction different from the first spatial direction. In some embodiments, wherein the communicating includes transmitting, by the first wireless communication device to the second wireless communication device, the first uplink control channel signal. In some embodiments, wherein the communicating includes spreading, by the first wireless communication device, the first reference signal in frequency based on the first frequency spreading; and spreading, by the first wireless communication device, the first uplink control information signal in frequency based on the second frequency spreading sequence. In some embodiments, wherein the communicating includes transmitting, by the first wireless communication device to the second wireless communication device, the first uplink control information signal in the first spatial direction.

Further embodiments of the present disclosure include a method of wireless communication, comprising obtaining, by a first wireless communication device, an uplink control channel multiplex configuration indicating a portion of a first frequency interlace of a plurality of frequency interlaces in a frequency spectrum; and communicating, by the first wireless communication device with a second wireless communication device, a first uplink control channel signal using the portion of the first frequency interlace.

In some embodiments, wherein the frequency spectrum is shared by multiple network operating entities, and wherein the first wireless communication device and the second wireless communication device are associated with one of the multiple network operating entities. In some embodiments, wherein each of the plurality of frequency interlaces includes a set of resource blocks spaced apart from each by at least one other resource block in the frequency spectrum, and wherein the first frequency interlace includes a different set of resource blocks than a second frequency interlace of the plurality of frequency interlaces. In some embodiments, wherein the communicating includes receiving, by the first wireless communication device from the second wireless communication device, the first uplink control channel signal. In some embodiments, the method further comprises receiving, by the first wireless communication device from a third wireless communication device, a second uplink control channel signal from another portion of the first frequency interlace. In some embodiments, the method further comprises selecting, by the first wireless communication device, the portion of the first frequency interlace based on a link parameter associated with the second wireless communication device. In some embodiments, wherein the communicating includes transmitting, by the first wireless communication device to the second wireless communication device, the first uplink control channel signal. In some embodiments, wherein the communicating includes communicating the first uplink control channel signal including at least one of a physical uplink control channel (PUCCH) format 0 signal, a PUCCH format 2 signal, a PUCCH format 3 signal, or a PUCCH format 4 signal based on a time spreading sequence. In some embodiments, wherein the communicating includes communicating the first uplink control channel signal including a physical uplink control channel (PUCCH) format 1 signal based on a cyclic-shift separation.

Further embodiments of the present disclosure include an apparatus comprising a processor configured to obtain an uplink control channel multiplex configuration indicating a first frequency spreading sequence and at least one of a second frequency spreading sequence or a first spatial direction; and a transceiver configured to communicate, with a second wireless communication device, a first uplink control channel signal including a first reference signal and a first uplink control information signal in a frequency spectrum based on the uplink control channel multiplex configuration, wherein the first reference signal is based on the first frequency spreading sequence and the first uplink control information signal is based on at least one of the second frequency spreading sequence or the first spatial direction.

In some embodiments, wherein the first uplink control channel signal is a short physical uplink control channel (PUCCH) format 2 signal. In some embodiments, wherein the frequency spectrum is shared by multiple network operating entities, and wherein the first uplink control channel signal is communicated using a set of resource blocks spaced apart from each other by at least one other resource block in the frequency spectrum. In some embodiments, wherein transceiver is further configured to communicate the first uplink control channel signal by receiving, from the second wireless communication device, the first reference signal from first frequency resources based on the first frequency spreading sequence; and receiving, from the second wireless communication device, the first uplink control information signal from second frequency resources different from first frequency resources based on at least one of the second frequency spreading sequence or the first spatial direction. In some embodiments, wherein transceiver is further configured to receive, from a third wireless communication device, a second reference signal of a second uplink control channel signal from the first frequency resources based on a third frequency spreading sequence different from the first frequency spreading sequence; and receive, from the third wireless communication device, a second uplink control information signal of the second uplink control channel signal from the second frequency resources based on a fourth frequency spreading sequence different from the second frequency spreading sequence. In some embodiments, wherein transceiver is further configured to receive, from a third wireless communication device, a second reference signal of a second uplink control channel signal from the first frequency resources based on a third frequency spreading sequence different from the first frequency spreading sequence; and receive, from the third wireless communication device, a second uplink control information signal of the second uplink control channel signal from the second frequency resources based on a second spatial direction different from the first spatial direction. In some embodiments, wherein transceiver is further configured to communicate the first uplink control channel signal by transmitting, to the second wireless communication device, the first uplink control channel signal. In some embodiments, wherein transceiver is further configured to communicate the first uplink control channel signal by spreading the first reference signal in frequency based on the first frequency spreading; and spreading the first uplink control information signal in frequency based on the second frequency spreading sequence. In some embodiments, wherein transceiver is further configured to communicate the first uplink control channel signal by transmitting, to the second wireless communication device, the first uplink control information signal in the first spatial direction.

Further embodiments of the present disclosure include an apparatus comprising a processor configured to obtain an uplink control channel multiplex configuration indicating a portion of a first frequency interlace of a plurality of frequency interlaces in a frequency spectrum; and a transceiver configured to communicate, with a second wireless communication device, a first uplink control channel signal using the portion of the first frequency interlace.

In some embodiments, wherein the frequency spectrum is shared by multiple network operating entities, and wherein the apparatus and the second wireless communication device are associated with one of the multiple network operating entities. In some embodiments, wherein each of the plurality of frequency interlaces includes a set of resource blocks spaced apart from each by at least one other resource block in the frequency spectrum, and wherein the first frequency interlace includes a different set of resource blocks than a second frequency interlace of the plurality of frequency interlaces. In some embodiments, wherein transceiver is further configured to communicate the first uplink control channel signal by receiving, from the second wireless communication device, the first uplink control channel signal. In some embodiments, wherein transceiver is further configured to receive, from a third wireless communication device, a second uplink control channel signal from another portion of the first frequency interlace. In some embodiments, wherein processor is further configured to select the portion of the first frequency interlace based on a link parameter associated with the second wireless communication device. In some embodiments, wherein transceiver is further configured to communicate the first uplink control channel signal by transmitting, to the second wireless communication device, the first uplink control channel signal. In some embodiments, wherein transceiver is further configured to communicate the first uplink control channel signal by communicating the first uplink control channel signal including at least one of a physical uplink control channel (PUCCH) format 0 signal, a PUCCH format 2 signal, a PUCCH format 3 signal, or a PUCCH format 4 signal based on a time spreading sequence. In some embodiments, wherein transceiver is further configured to communicate the first uplink control channel signal by communicating the first uplink control channel signal including a physical uplink control channel (PUCCH) format 1 signal based on a cyclic-shift separation.

Further embodiments of the present disclosure include a computer-readable medium having program code recorded thereon, the program code comprising code for causing a first wireless communication device to obtain an uplink control channel multiplex configuration indicating a first frequency spreading sequence and at least one of a second frequency spreading sequence or a first spatial direction; and code for causing the first wireless communication device to communicate, with a second wireless communication device, a first uplink control channel signal including a first reference signal and a first uplink control information signal in a frequency spectrum based on the uplink control channel multiplex configuration, wherein the first reference signal is based on the first frequency spreading sequence and the first uplink control information signal is based on at least one of the second frequency spreading sequence or the first spatial direction.

In some embodiments, wherein the first uplink control channel signal is a short physical uplink control channel (PUCCH) format 2 signal. In some embodiments, wherein the frequency spectrum is shared by multiple network operating entities, and wherein the first uplink control channel signal is communicated using a set of resource blocks spaced apart from each other by at least one other resource block in the frequency spectrum. In some embodiments, wherein the code for causing the first wireless communication device to communicating the first uplink control channel signal is further configured to receive, from the second wireless communication device, the first reference signal from first frequency resources based on the first frequency spreading sequence; and receive, from the second wireless communication device, the first uplink control information signal from second frequency resources different from first frequency resources based on at least one of the second frequency spreading sequence or the first spatial direction. In some embodiments, the computer-readable further comprises code for causing the first wireless communication device to receive, from a third wireless communication device, a second reference signal of a second uplink control channel signal from the first frequency resources based on a third frequency spreading sequence different from the first frequency spreading sequence; and code for causing the first wireless communication device to receive, from the third wireless communication device, a second uplink control information signal of the second uplink control channel signal from the second frequency resources based on a fourth frequency spreading sequence different from the second frequency spreading sequence. In some embodiments, the computer-readable medium further comprises code for causing the first wireless communication device to receive, from a third wireless communication device, a second reference signal of a second uplink control channel signal from the first frequency resources based on a third frequency spreading sequence different from the first frequency spreading sequence; and code for causing the first wireless communication device to receive, from the third wireless communication device, a second uplink control information signal of the second uplink control channel signal from the second frequency resources based on a second spatial direction different from the first spatial direction. In some embodiments, wherein the code for causing the first wireless communication device to communicate the first uplink control channel signal is further configured to transmit, to the second wireless communication device, the first uplink control channel signal. In some embodiments, wherein the code for causing the first wireless communication device to communicate the first uplink control channel signal is further configured to spread the first reference signal in frequency based on the first frequency spreading; and spread the first uplink control information signal in frequency based on the second frequency spreading sequence. In some embodiments, wherein the code for causing the first wireless communication device to communicate the first uplink control channel signal is further configured to transmit, to the second wireless communication device, the first uplink control information signal in the first spatial direction.

Further embodiments of the present disclosure include a computer-readable medium having program code recorded thereon, the program code comprising code for causing a first wireless communication device to obtain an uplink control channel multiplex configuration indicating a portion of a first frequency interlace of a plurality of frequency interlaces in a frequency spectrum; and code for causing the first wireless communication device to communicate, with a second wireless communication device, a first uplink control channel signal using the portion of the first frequency interlace.

In some embodiments, wherein the frequency spectrum is shared by multiple network operating entities, and wherein the first wireless communication device and the second wireless communication device are associated with one of the multiple network operating entities. In some embodiments, wherein each of the plurality of frequency interlaces includes a set of resource blocks spaced apart from each by at least one other resource block in the frequency spectrum, and wherein the first frequency interlace includes a different set of resource blocks than a second frequency interlace of the plurality of frequency interlaces. In some embodiments, wherein the code for causing the first wireless communication device to communicate the first uplink control channel signal is further configured to receive, from the second wireless communication device, the first uplink control channel signal. In some embodiments, the computer-readable medium further comprises code for causing the first wireless communication device to receive, from a third wireless communication device, a second uplink control channel signal from another portion of the first frequency interlace. In some embodiments, the computer-readable medium further comprises code for causing the first wireless communication device to select the portion of the first frequency interlace based on a link parameter associated with the second wireless communication device. In some embodiments, the computer-readable medium of claim 46, wherein the code for causing the first wireless communication device to communicate the first uplink control channel signal is further configured to transmit, to the second wireless communication device, the first uplink control channel signal. In some embodiments, wherein the code for causing the first wireless communication device to communicate the first uplink control channel signal is further configured to communicate the first uplink control channel signal including at least one of a physical uplink control channel (PUCCH) format 0 signal, a PUCCH format 2 signal, a PUCCH format 3 signal, or a PUCCH format 4 signal based on a time spreading sequence. In some embodiments, wherein the code for causing the first wireless communication device to communicate the first uplink control channel signal is further configured to communicate the first uplink control channel signal including a physical uplink control channel (PUCCH) format 1 signal based on a cyclic-shift separation.

Further embodiments of the present disclosure include an apparatus comprising means for obtaining an uplink control channel multiplex configuration indicating a first frequency spreading sequence and at least one of a second frequency spreading sequence or a first spatial direction; and means for communicating, with a second wireless communication device, a first uplink control channel signal including a first reference signal and a first uplink control information signal in a frequency spectrum based on the uplink control channel multiplex configuration, wherein the first reference signal is based on the first frequency spreading sequence and the first uplink control information signal is based on at least one of the second frequency spreading sequence or the first spatial direction.

In some embodiments, wherein the first uplink control channel signal is a short physical uplink control channel (PUCCH) format 2 signal. In some embodiments, wherein the frequency spectrum is shared by multiple network operating entities, and wherein the first uplink control channel signal is communicated using a set of resource blocks spaced apart from each other by at least one other resource block in the frequency spectrum. In some embodiments, wherein the means for communicating the first uplink control channel signal is further configured to receive, from the second wireless communication device, the first reference signal from first frequency resources based on the first frequency spreading sequence; and receive, from the second wireless communication device, the first uplink control information signal from second frequency resources different from first frequency resources based on at least one of the second frequency spreading sequence or the first spatial direction. In some embodiments, the apparatus further comprises means for receiving, from a third wireless communication device, a second reference signal of a second uplink control channel signal from the first frequency resources based on a third frequency spreading sequence different from the first frequency spreading sequence; and means for receiving, from the third wireless communication device, a second uplink control information signal of the second uplink control channel signal from the second frequency resources based on a fourth frequency spreading sequence different from the second frequency spreading sequence. In some embodiments, the apparatus further comprises means for receiving, from a third wireless communication device, a second reference signal of a second uplink control channel signal from the first frequency resources based on a third frequency spreading sequence different from the first frequency spreading sequence; and means for receiving, from the third wireless communication device, a second uplink control information signal of the second uplink control channel signal from the second frequency resources based on a second spatial direction different from the first spatial direction. In some embodiments, wherein the means for communicating the first uplink control channel signal is further configured to transmit, to the second wireless communication device, the first uplink control channel signal. In some embodiments, wherein the means for communicating the first uplink control channel signal is further configured to spread the first reference signal in frequency based on the first frequency spreading; and spread the first uplink control information signal in frequency based on the second frequency spreading sequence. In some embodiments, wherein the means for communicating the first uplink control channel signal is further configured to transmit, to the second wireless communication device, the first uplink control information signal in the first spatial direction.

Further embodiments of the present disclosure include an apparatus comprising means for obtaining an uplink control channel multiplex configuration indicating a portion of a first frequency interlace of a plurality of frequency interlaces in a frequency spectrum; and means for communicating, with a second wireless communication device, a first uplink control channel signal using the portion of the first frequency interlace.

In some embodiments, wherein the frequency spectrum is shared by multiple network operating entities, and wherein the apparatus and the second wireless communication device are associated with one of the multiple network operating entities. In some embodiments, wherein each of the plurality of frequency interlaces includes a set of resource blocks spaced apart from each by at least one other resource block in the frequency spectrum, and wherein the first frequency interlace includes a different set of resource blocks than a second frequency interlace of the plurality of frequency interlaces. In some embodiments, wherein the means for communicating the first uplink control channel signal is further configured to receive, from the second wireless communication device, the first uplink control channel signal. In some embodiments, the apparatus further comprises means for receiving, from a third wireless communication device, a second uplink control channel signal from another portion of the first frequency interlace. In some embodiments, the apparatus further comprises means for selecting the portion of the first frequency interlace based on a link parameter associated with the second wireless communication device. In some embodiments, wherein the means for communicating the first uplink control channel signal is further configured to transmit, to the second wireless communication device, the first uplink control channel signal. In some embodiments, wherein the means for communicating the first uplink control channel signal is further configured to communicate the first uplink control channel signal including at least one of a physical uplink control channel (PUCCH) format 0 signal, a PUCCH format 2 signal, a PUCCH format 3 signal, or a PUCCH format 4 signal based on a time spreading sequence. In some embodiments, wherein the means for communicating the first uplink control channel signal is further configured to communicate the first uplink control channel signal including a physical uplink control channel (PUCCH) format 1 signal based on a cyclic-shift separation.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a base station (BS), comprising:

transmitting, to a user equipment (UE), an uplink control channel multiplex configuration indicating a first frequency spreading sequence and a second frequency spreading sequence; and receiving, from the UE, an uplink control channel signal including a first reference signal and a first uplink control information signal in a frequency spectrum based on the uplink control channel multiplex configuration, wherein the first reference signal is received using first frequency resources based on the first frequency spreading sequence, and wherein the first uplink control information signal is received using second frequency resources based on the second frequency spreading sequence, and the first and second frequency resources are different.

2. The method of claim 1, wherein the uplink control channel signal is a physical uplink control channel (PUCCH) format 2 signal.

3. The method of claim 1, wherein receiving the uplink control channel signal comprises receiving the uplink control channel signal using a set of resource blocks spaced apart from each other by at least one other resource block in the frequency spectrum.

4. The method of claim 1, wherein the receiving the uplink control channel signal comprises receiving the uplink control channel signal via a physical uplink control channel (PUCCH).

5. The method of claim 4, wherein:
the first reference signal is spread in frequency based on the first frequency spreading sequence; and
the first uplink control information signal is spread in frequency based on the second frequency spreading sequence.

6. The method of claim 1,
wherein the first frequency spreading sequence includes a first code denoted as positive and a second code denoted as positive; and
wherein the second frequency spreading sequence includes a third code denoted as positive and a fourth code denoted as positive.

7. The method of claim 6, wherein:
the first frequency spreading sequence is orthogonal to a third frequency spreading sequence associated with a second UE; and
the second frequency spreading sequence is orthogonal to a fourth frequency spreading sequence associated with the second UE.

8. The method of claim 2, wherein the first reference signal is a demodulation reference signal (DMRS).

9. A base station (BS), comprising:
a memory;
a transceiver; and
a processor coupled with the memory and the transceiver and configured, when executing instructions stored on the memory, to cause the BS to:
transmit an uplink control channel multiplex configuration to a user equipment (UE) indicating a first frequency spreading sequence and a second frequency spreading sequence; and
receive an uplink control channel signal from the UE including a first reference signal and a first uplink control information signal in a frequency spectrum based on the uplink control channel multiplex configuration, wherein the first reference signal is received using first frequency resources based on the first frequency spreading sequence, and wherein the first uplink control information signal is received using second frequency resources based on the second frequency spreading sequence, and the first and second frequency resources are different.

10. The BS of claim 9, wherein the uplink control channel signal is a physical uplink control channel (PUCCH) format 2 signal.

11. The BS of claim 9, wherein receiving the uplink control channel signal comprises receiving the uplink control channel signal using a set of resource blocks spaced apart from each other by at least one other resource block in the frequency spectrum.

12. The BS of claim 9, wherein the processor is further configured to:

receive the uplink control channel signal via a physical uplink control channel (PUCCH).

13. The BS of claim 12, wherein:

the first reference signal is spread in frequency based on the first frequency spreading sequence; and the first uplink control information signal is spread in frequency based on the second frequency spreading sequence.

14. The BS of claim 9, wherein the first frequency spreading sequence includes a first code denoted as positive and a second code denoted as positive; and wherein the second frequency spreading sequence includes a third code denoted as positive and a fourth code denoted as positive.

15. The BS of claim 14, wherein:

the first frequency spreading sequence is orthogonal to a third frequency spreading sequence associated with a second UE; and the second frequency spreading sequence is orthogonal to a fourth frequency spreading sequence associated with the second UE.

16. The BS of claim 9, wherein the first reference signal is a demodulation reference signal (DMRS).

17. A non-transitory computer-readable medium having program code recorded thereon for execution by a base station (BS), the program code comprising:

code for causing the BS to transmit, to a user equipment (UE), an uplink control channel multiplex configuration indicating a first frequency spreading sequence and a second frequency spreading sequence; and code for causing the BS to receive, from the UE, an uplink control channel signal including a first reference signal and a first uplink control information signal in a frequency spectrum based on the uplink control channel multiplex configuration, wherein the first reference signal is received using first frequency resources based on the first frequency spreading sequence, and wherein the first uplink control information signal is received using second frequency resources based on the second frequency spreading sequence, and the first and second frequency resources are different.

18. The non-transitory computer-readable medium of claim 17, wherein the code for causing the BS to receive the uplink control channel signal comprises:

code for causing the BS to receive the uplink control information signal as a physical uplink control channel (PUCCH) format 2 signal.

19. The non-transitory computer-readable medium of claim 17, wherein:

the first frequency spreading sequence is orthogonal to a third frequency spreading sequence associated with a second UE; and the second frequency spreading sequence is orthogonal to a fourth frequency spreading sequence associated with the second UE.

20. The non-transitory computer-readable medium of claim 18, wherein the code for causing the BS to receive the uplink control channel signal comprises:

code for causing the BS to receive the first reference signal as a demodulation reference signal (DMRS).

* * * * *